United States Patent
Mageswaran et al.

(10) Patent No.: US 10,642,694 B2
(45) Date of Patent: May 5, 2020

(54) MONITORING CONTAINERS IN A DISTRIBUTED COMPUTING SYSTEM

(71) Applicant: Robin Systems, Inc., San Jose, CA (US)

(72) Inventors: Manjunath Mageswaran, San Jose, CA (US); Ravi Kumar Alluboyina, Santa Clara, CA (US); Giridharan Kesavan, Pleasanton, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 169 days.

(21) Appl. No.: 15/870,296

(22) Filed: Jan. 12, 2018

(65) Prior Publication Data
US 2019/0220361 A1 Jul. 18, 2019

(51) Int. Cl.
| | |
|---|---|
| *G06F 11/07* | (2006.01) |
| *G06F 11/14* | (2006.01) |
| *G06F 11/30* | (2006.01) |
| *G06F 11/34* | (2006.01) |

(52) U.S. Cl.
CPC ........ *G06F 11/1438* (2013.01); *G06F 11/302* (2013.01); *G06F 11/3409* (2013.01); *G06F 2201/805* (2013.01)

(58) Field of Classification Search
CPC .......................... G06F 11/0793; G06F 11/302
USPC .......................................................... 714/38.1
See application file for complete search history.

(56) References Cited

U.S. PATENT DOCUMENTS

| | | |
|---|---|---|
| 4,310,883 A | 1/1982 | Clifton |
| 5,602,993 A | 2/1997 | Stromberg |
| 6,014,669 A | 1/2000 | Slaughter |
| 6,119,214 A | 9/2000 | Dirks |
| 6,157,963 A | 12/2000 | Courtright, II |

(Continued)

FOREIGN PATENT DOCUMENTS

WO WO2017008675 1/2017

OTHER PUBLICATIONS

Implementing time critical functionalities with a distributed adaptive container architecture, Stankovski, Nov. 28, 2016.

(Continued)

*Primary Examiner* — Chae M Ko
(74) *Attorney, Agent, or Firm* — David R. Stevens; Stevens Law Group

(57) ABSTRACT

A new snapshot of a storage volume is created by instructing computing nodes to suppress write requests. Once pending write requests from the computing nodes are completed, storage nodes create a new snapshot for the storage volume by allocating a new segment to the new snapshot and finalizes and performs garbage collection with respect to segments allocated to the previous snapshot. An orchestration layer implements a multi-role application that is provisioned with virtualized storage and computation resources. A snapshot of the application may be created and used to rollback or clone the application. Containers may be loaded with data structures for encrypted and/or authenticated communication. Failed storage volumes may be detected and repaired. Repopulating repaired volumes may be managed by an application or a storage manager implementing a virtualized storage system. An autopilot invokes repair of failed containers and storage nodes in response to detected failures.

16 Claims, 23 Drawing Sheets

(56) References Cited

U.S. PATENT DOCUMENTS

| | | | |
|---|---|---|---|
| 6,161,191 A | 12/2000 | Slaughter | |
| 6,298,478 B1 | 10/2001 | Nally | |
| 6,301,707 B1 | 10/2001 | Carroll | |
| 6,311,193 B1 | 10/2001 | Sekido | |
| 6,851,034 B2 | 2/2005 | Challenger | |
| 6,886,160 B1 | 4/2005 | Lee | |
| 6,895,485 B1 | 5/2005 | Dekoning | |
| 6,957,221 B1 | 10/2005 | Hart | |
| 7,096,465 B1 | 8/2006 | Dardinski | |
| 7,111,055 B2 | 9/2006 | Falkner | |
| 7,171,659 B2 | 1/2007 | Becker | |
| 7,246,351 B2 | 7/2007 | Bloch | |
| 7,305,671 B2 | 12/2007 | Davidov | |
| 7,461,374 B1 | 12/2008 | Balint | |
| 7,590,620 B1 | 9/2009 | Pike | |
| 7,698,698 B2 | 4/2010 | Skan | |
| 7,721,283 B2 | 5/2010 | Kovachka | |
| 7,734,859 B2 | 6/2010 | Daniel | |
| 7,738,457 B2 | 6/2010 | Nordmark | |
| 7,779,091 B2 | 8/2010 | Wilkinson | |
| 7,797,693 B1 | 9/2010 | Gustafson | |
| 7,984,485 B1 | 7/2011 | Rao | |
| 8,037,471 B2 | 10/2011 | Keller | |
| 8,121,874 B1 | 2/2012 | Guheen | |
| 8,171,141 B1 | 5/2012 | Offer | |
| 8,219,821 B2 | 7/2012 | Zimmels | |
| 8,261,295 B1 | 9/2012 | Risbood | |
| 8,326,883 B2 | 12/2012 | Pizzorni | |
| 8,392,498 B2 | 3/2013 | Berg | |
| 8,464,241 B2 | 6/2013 | Hayton | |
| 8,505,003 B2 | 8/2013 | Bowen | |
| 8,527,544 B1 | 9/2013 | Colgrove | |
| 8,601,467 B2 | 12/2013 | Hofhansl | |
| 8,620,973 B1 | 12/2013 | Veeraswamy | |
| 8,666,933 B2 | 3/2014 | Pizzorni | |
| 8,745,003 B1 | 6/2014 | Patterson | |
| 8,782,632 B1 | 7/2014 | Chigurapati | |
| 8,788,634 B2 | 7/2014 | Krig | |
| 8,832,324 B1 | 9/2014 | Hodges | |
| 8,886,806 B2 | 11/2014 | Tung | |
| 8,909,885 B2 | 12/2014 | Corbett | |
| 8,966,198 B1 | 2/2015 | Harris | |
| 9,134,992 B2 | 9/2015 | Wong | |
| 9,148,465 B2 | 9/2015 | Gambardella | |
| 9,152,337 B2 | 10/2015 | Kono | |
| 9,167,028 B1 | 10/2015 | Bansal | |
| 9,280,591 B1 | 3/2016 | Kharatishvili | |
| 9,330,155 B1 | 5/2016 | Bono | |
| 9,336,060 B2 | 5/2016 | Nori | |
| 9,342,444 B2 | 5/2016 | Minckler | |
| 9,367,301 B1 | 6/2016 | Serrano | |
| 9,436,693 B1 | 9/2016 | Lockhart | |
| 9,521,198 B1 | 12/2016 | Agarwala | |
| 9,569,274 B2 | 2/2017 | Tarta | |
| 9,600,193 B2 | 3/2017 | Ahrens | |
| 9,619,389 B1 | 4/2017 | Roug | |
| 9,635,132 B1 | 4/2017 | Lin | |
| 9,667,470 B2 | 5/2017 | Prathipati | |
| 9,747,096 B2 | 8/2017 | Searlee | |
| 9,870,366 B1 | 1/2018 | Duan | |
| 9,892,265 B1 | 2/2018 | Tripathy | |
| 9,998,955 B1* | 6/2018 | MacCarthaigh | H04L 69/22 |
| 10,019,459 B1 | 7/2018 | Agarwala | |
| 10,042,628 B2 | 8/2018 | Thompson | |
| 10,061,520 B1 | 8/2018 | Zhao | |
| 10,191,778 B1 | 1/2019 | Yang | |
| 10,241,774 B2 | 3/2019 | Spivak | |
| 10,282,229 B2 | 5/2019 | Wagner | |
| 10,430,434 B2 | 10/2019 | Sun | |
| 2004/0153703 A1* | 8/2004 | Vigue | G06F 11/3006 714/4.4 |
| 2004/0221125 A1 | 11/2004 | Ananthanarayanan | |
| 2005/0065986 A1 | 3/2005 | Bixby | |
| 2005/0216895 A1 | 9/2005 | Tran | |
| 2006/0085674 A1 | 4/2006 | Ananthamurthy | |
| 2007/0006015 A1* | 1/2007 | Rao | G06F 11/2028 714/4.1 |
| 2007/0067583 A1 | 3/2007 | Zohar | |
| 2007/0260842 A1 | 11/2007 | Faibish | |
| 2007/0288791 A1* | 12/2007 | Allen | G06F 11/0709 714/4.11 |
| 2008/0189468 A1 | 8/2008 | Schmidt | |
| 2008/0270592 A1 | 10/2008 | Choudhary | |
| 2009/0144497 A1 | 6/2009 | Withers | |
| 2009/0172335 A1 | 7/2009 | Kulkarni et al. | |
| 2009/0307249 A1 | 12/2009 | Koifman | |
| 2010/0161941 A1 | 6/2010 | Vyshetsky | |
| 2010/0162233 A1 | 6/2010 | Ku | |
| 2010/0211815 A1 | 8/2010 | Mankovskii | |
| 2010/0274984 A1 | 10/2010 | Inomata | |
| 2010/0299309 A1 | 11/2010 | Maki | |
| 2010/0306495 A1 | 12/2010 | Kumano | |
| 2010/0332730 A1 | 12/2010 | Royer | |
| 2011/0083126 A1 | 4/2011 | Bhakta | |
| 2011/0188506 A1 | 8/2011 | Arribas | |
| 2011/0208928 A1 | 8/2011 | Chandra | |
| 2011/0246420 A1* | 10/2011 | Wang | G06F 16/24552 707/624 |
| 2011/0276951 A1* | 11/2011 | Jain | G06F 11/3006 717/140 |
| 2012/0005557 A1 | 1/2012 | Mardiks | |
| 2012/0066449 A1 | 3/2012 | Colgrove | |
| 2012/0102369 A1 | 4/2012 | Hiltunen | |
| 2012/0216052 A1 | 8/2012 | Dunn | |
| 2012/0226667 A1 | 9/2012 | Volvovski | |
| 2012/0240012 A1 | 9/2012 | Weathers | |
| 2012/0265976 A1 | 10/2012 | Spiers | |
| 2012/0311671 A1 | 12/2012 | Wood | |
| 2012/0331113 A1 | 12/2012 | Jain | |
| 2013/0054552 A1 | 2/2013 | Hawkins | |
| 2013/0054932 A1* | 2/2013 | Acharya | G06F 3/0605 711/202 |
| 2013/0339659 A1 | 12/2013 | Bybell | |
| 2013/0346709 A1 | 12/2013 | Wang | |
| 2014/0006465 A1 | 1/2014 | Davis | |
| 2014/0047263 A1 | 2/2014 | Coatney | |
| 2014/0047341 A1 | 2/2014 | Breternitz | |
| 2014/0047342 A1* | 2/2014 | Breternitz | G06F 9/5061 715/735 |
| 2014/0058871 A1 | 2/2014 | Marr | |
| 2014/0059527 A1 | 2/2014 | Gagliardi | |
| 2014/0059528 A1 | 2/2014 | Gagliardi | |
| 2014/0108483 A1 | 4/2014 | Tarta | |
| 2014/0245319 A1 | 8/2014 | Fellows | |
| 2015/0046644 A1 | 2/2015 | Karp | |
| 2015/0067031 A1 | 3/2015 | Acharya | |
| 2015/0074358 A1 | 3/2015 | Flinsbaugh | |
| 2015/0112951 A1* | 4/2015 | Narayanamurthy | G06F 16/172 707/694 |
| 2015/0134857 A1 | 5/2015 | Hahn | |
| 2015/0186217 A1 | 7/2015 | Eslami | |
| 2015/0326481 A1 | 11/2015 | Rector | |
| 2015/0379287 A1 | 12/2015 | Mathur | |
| 2016/0011816 A1 | 1/2016 | Aizman | |
| 2016/0042005 A1 | 2/2016 | Liu | |
| 2016/0124775 A1 | 5/2016 | Ashtiani | |
| 2016/0197995 A1 | 7/2016 | Lu | |
| 2016/0259597 A1 | 9/2016 | Worley | |
| 2016/0283261 A1 | 9/2016 | Nakatsu | |
| 2016/0357456 A1 | 12/2016 | Iwasaki | |
| 2016/0357548 A1 | 12/2016 | Stanton | |
| 2017/0060975 A1 | 3/2017 | Akyureklier | |
| 2017/0149843 A1 | 5/2017 | Amulothu | |
| 2017/0168903 A1 | 6/2017 | Dornemann | |
| 2017/0192889 A1 | 7/2017 | Sato | |
| 2017/0242719 A1 | 8/2017 | Tsirkin | |
| 2017/0244557 A1 | 8/2017 | Riel | |
| 2017/0244787 A1 | 8/2017 | Rangasamy | |
| 2017/0322954 A1* | 11/2017 | Horowitz | G06F 16/211 |
| 2017/0337492 A1 | 11/2017 | Chen | |
| 2017/0371551 A1 | 12/2017 | Sachdev | |
| 2018/0024889 A1* | 1/2018 | Verma | G06F 11/1438 714/15 |

(56) References Cited

U.S. PATENT DOCUMENTS

| | | | |
|---|---|---|---|
| 2018/0046553 A1 | 2/2018 | Okamoto | |
| 2018/0082053 A1 | 3/2018 | Brown | |
| 2018/0107419 A1 | 4/2018 | Sachdev | |
| 2018/0113625 A1 | 4/2018 | Sancheti | |
| 2018/0113770 A1 | 4/2018 | Hasanov | |
| 2018/0137306 A1* | 5/2018 | Brady | H04L 9/0643 |
| 2018/0159745 A1* | 6/2018 | Byers | H04L 43/08 |
| 2018/0165170 A1 | 6/2018 | Hegdal | |
| 2018/0218000 A1 | 8/2018 | Setty | |
| 2018/0246745 A1 | 8/2018 | Aronovich | |
| 2018/0247064 A1 | 8/2018 | Aronovich | |
| 2018/0285353 A1 | 10/2018 | Ramohalli | |
| 2018/0329981 A1 | 11/2018 | Gupte | |
| 2018/0364917 A1 | 12/2018 | Ki | |
| 2019/0065061 A1 | 2/2019 | Kim | |
| 2019/0073132 A1 | 3/2019 | Zhou | |
| 2019/0073372 A1 | 3/2019 | Venkatesan | |
| 2019/0079928 A1 | 3/2019 | Kumar | |
| 2019/0089651 A1* | 3/2019 | Pignataro | H04L 49/3009 |
| 2019/0156023 A1 | 5/2019 | Gerebe | |
| 2019/0188094 A1* | 6/2019 | Ramamoorthi | G06F 11/203 |
| 2019/0190803 A1 | 6/2019 | Joshi | |
| 2019/0213085 A1 | 7/2019 | Alluboyina | |
| 2019/0215313 A1 | 7/2019 | Doshi | |
| 2019/0220315 A1 | 7/2019 | Vallala | |

OTHER PUBLICATIONS

Precise memory leak detection for java software using container profiling, Xu, May 10, 2008.

Segment map, Feb. 4, 2019.

Fast and Secure Append-Only storage with Infinite Capacity, Zheng, Aug. 27, 2003.

User Mode and Kernel Mode, MICROSOFT, Apr. 19, 2017.

Precise memory leak detection for java software using container profiling, Xu, Jul. 2013.

Mogi et al., "Dynamic Parity Stripe Reorganizations for RAID5 Disk Arrays," 1994, IEEE, pp. 17-26.

Syed et al, "The Container Manager Pattern", ACM, pp. 1-9 (Year 2017).

Rehmann et al., "Performance of Containerized Database Management Systems", ACM, pp. 1-6 (Year 2018).

Awada et al, "Improving Resource Efficiency of Container-instance Clusters on Clouds", IEEE, pp. 929-934 (Year 2017).

Stankovski et al, "Implementing Time-Critical Functionalities with a Distributed Adaptive Container Architecture", ACM, pp. 1-5 (Year 2016).

Dhakate et al, "Distributed Cloud Monitoring Using Docker as Next Generation Container Virtualization Technology" IEEE, pp. 1-5 (Year 2015).

Crameri et al, "Staged Deployment in Mirage, an Integrated Software Upgrade Testing and Distribution System", ACM, pp. 221-236 (Year: 2007).

Cosmo et al, "Packages Upgrades in FOSS Distributions: Details and Challenges", ACM, pp. 1-5 (Year: 2008).

Burg et al, "Atomic Upgrading of Distributed Systems", ACM, pp. 1-5 (Year: 2008).

Souer et al, "Component Based Architecture for Web Content Management: Runtime Deployable Web Manager Component Bundles", IEEE, pp. 366-369 (Year: 2008).

* cited by examiner

MONITORING CONTAINERS IN A DISTRIBUTED COMPUTING SYSTEM

BACKGROUND

Field of the Invention

This invention relates to orchestration of roles in an application instantiated in a distributed storage and computation system.

Background of the Invention

In many contexts, it is helpful to be able to return a database or distributed application to an original state or some intermediate state. In this manner, changes to the distributed application or other database configuration parameters may be tested without fear of corrupting critical data.

The systems and methods disclosed herein provide an improved approach for creating snapshots of a database and returning to a previous snapshot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
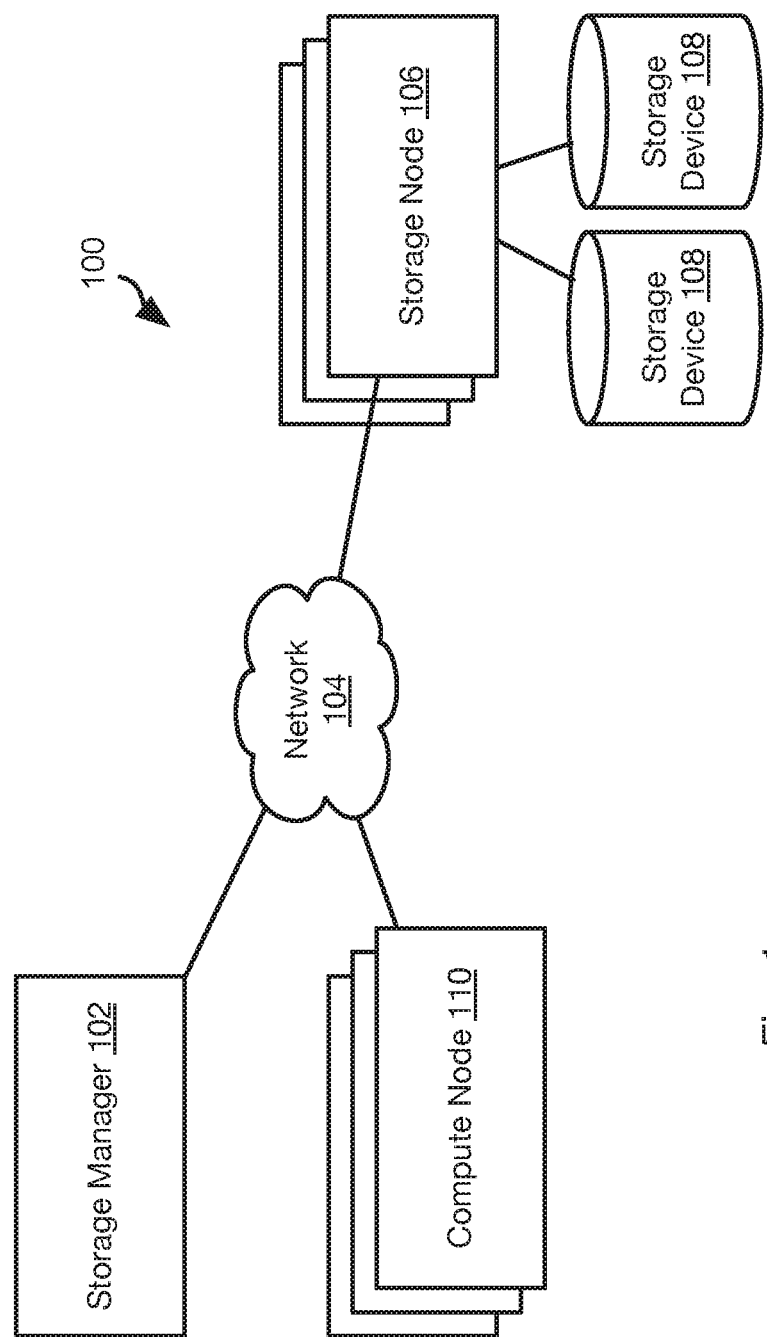
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
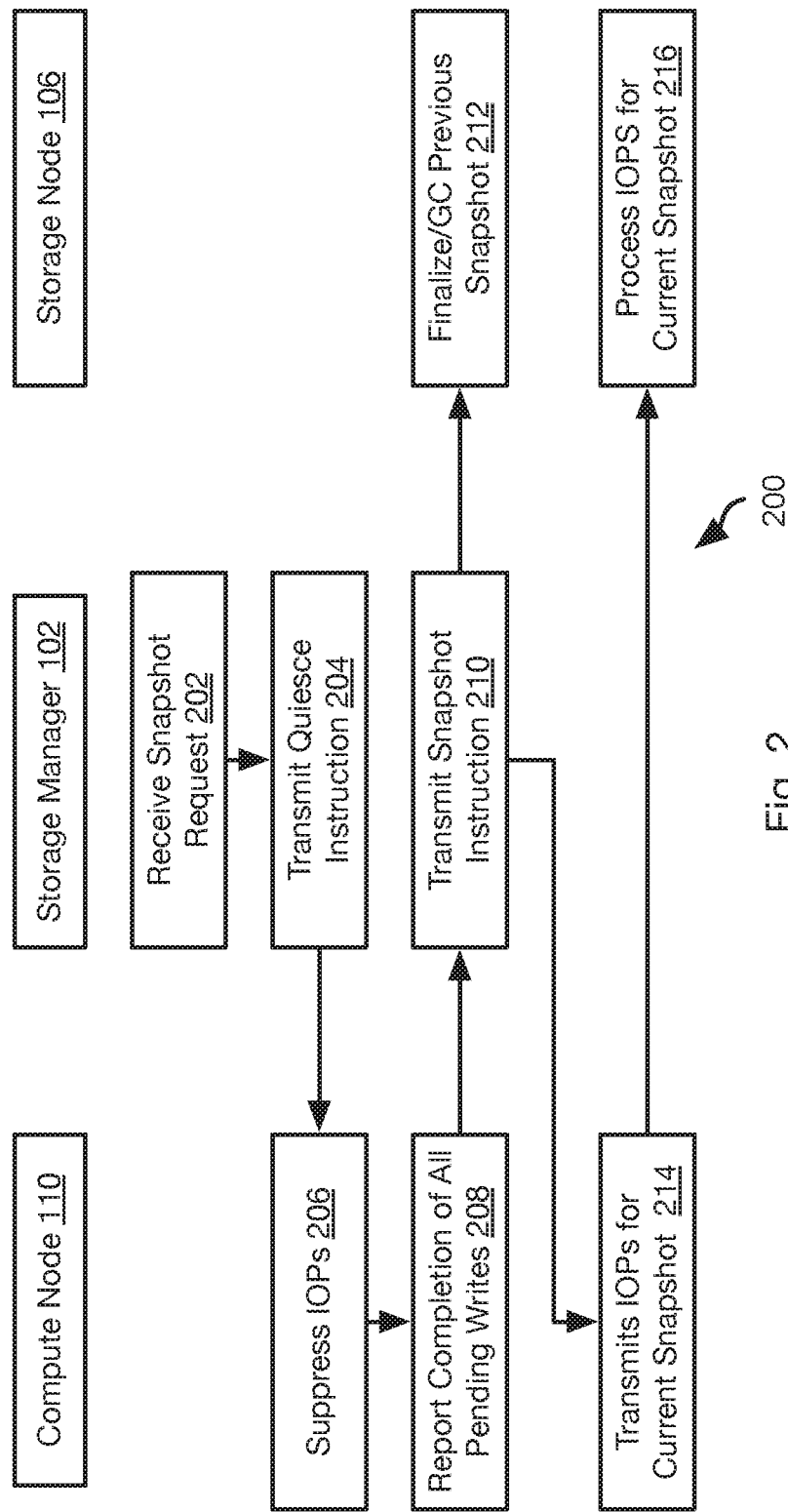
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is preferably not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

Figure 3:
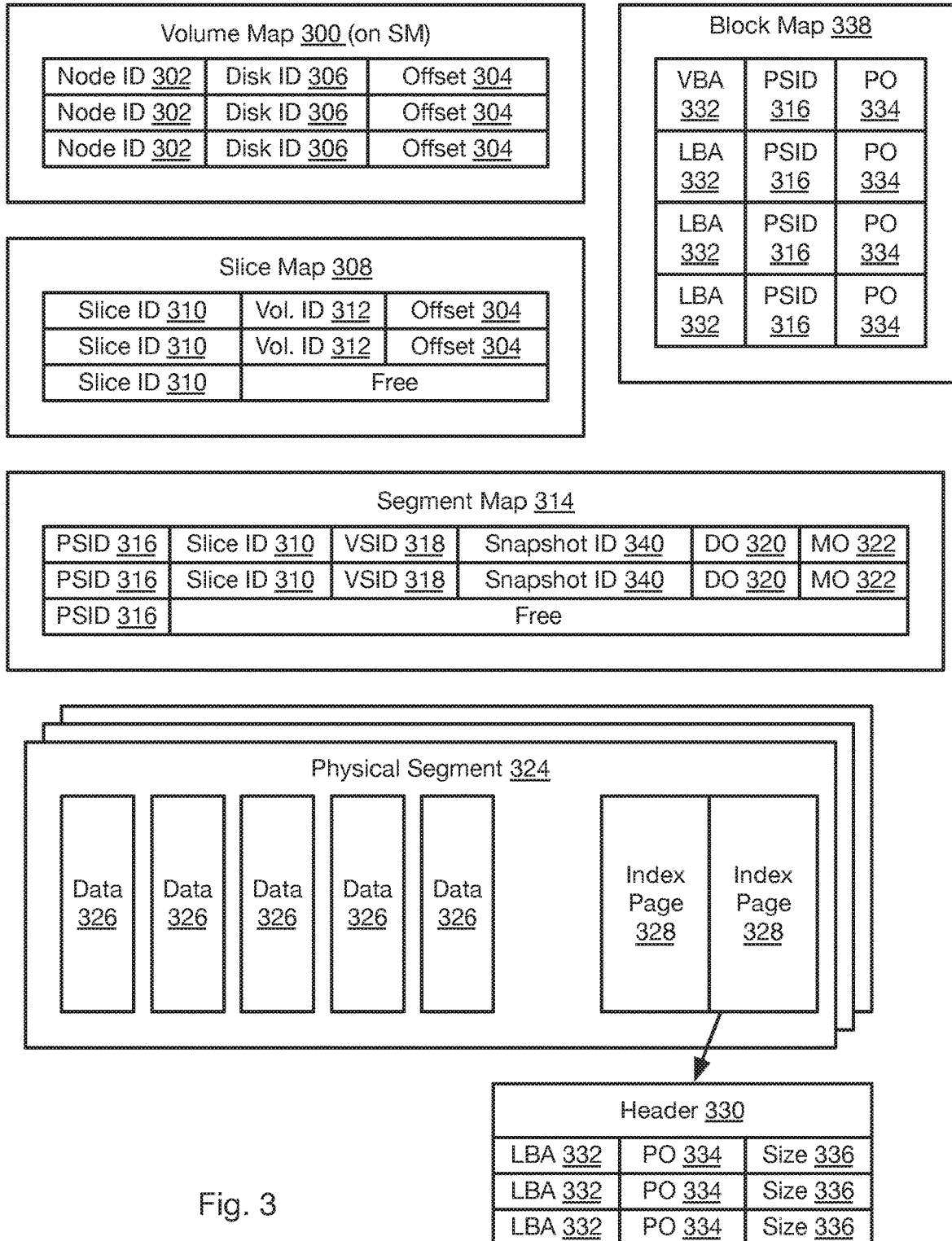
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
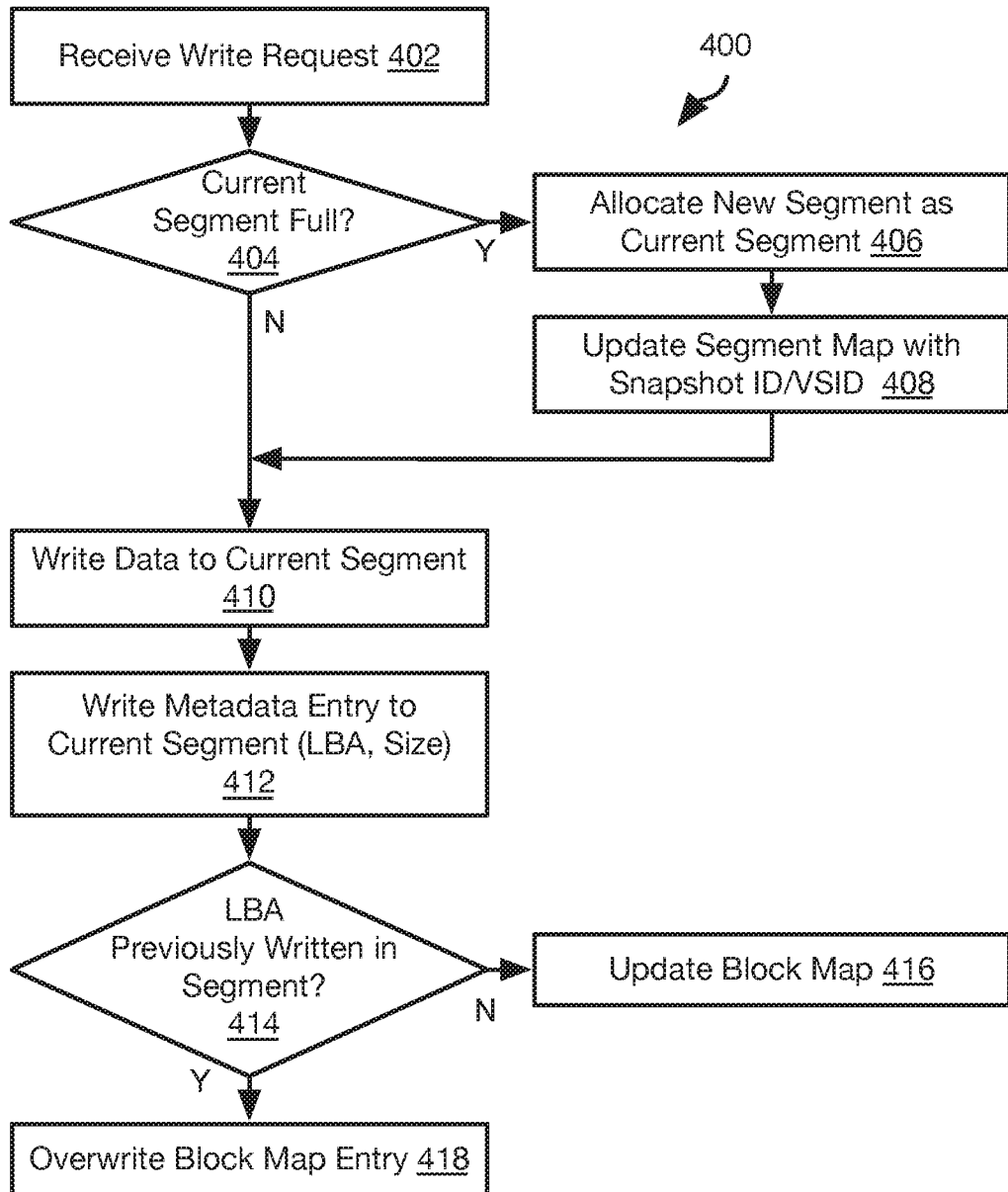
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes and entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

Figure 5:
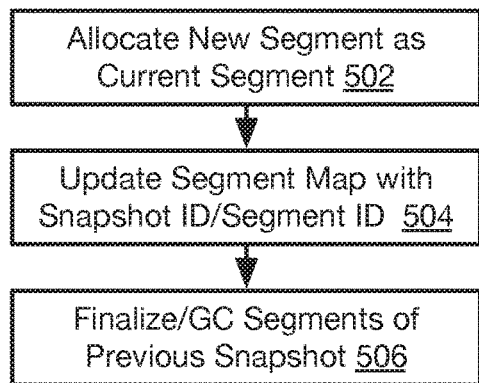
FIG. 5 is a process flow diagram of a method for processing a snapshot instruction by a storage node in accordance with an embodiment of the present invention.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 may be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

Figure 6:
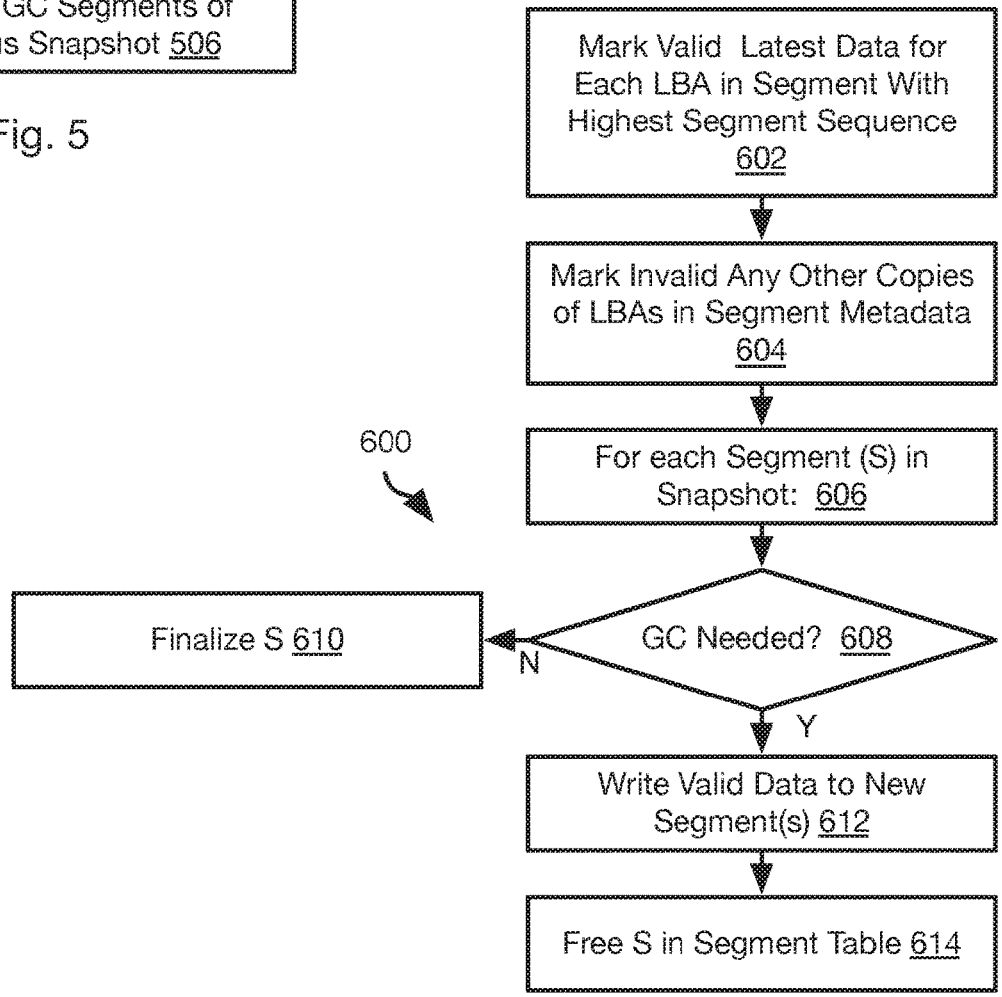
FIG. 6 is a process flow diagram of a method for performing garbage collection on segments in accordance with an embodiment of the present invention.

FIG. 6 illustrates a method 600 for finalizing and performing garbage collection with respect to segment IDs 340 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 334, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 302 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment maybe processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
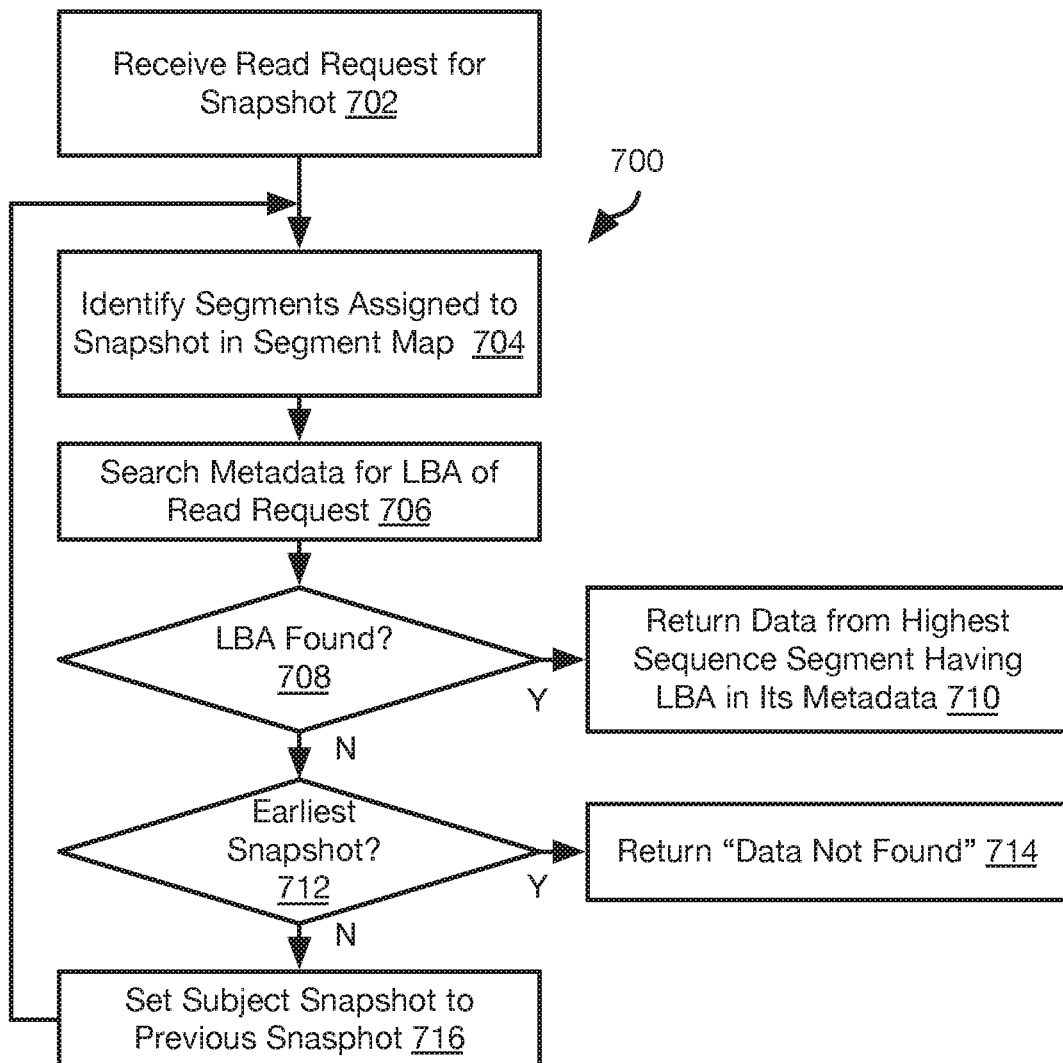
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 314 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 318 for the each LBA 332. Likewise, the physical offset 334 of the last-written data for that LBA 332 within the physical segment 324 for that PSID 316 may be identified as described above (e.g., as described above with respect to steps 704-716).

Figure 8:
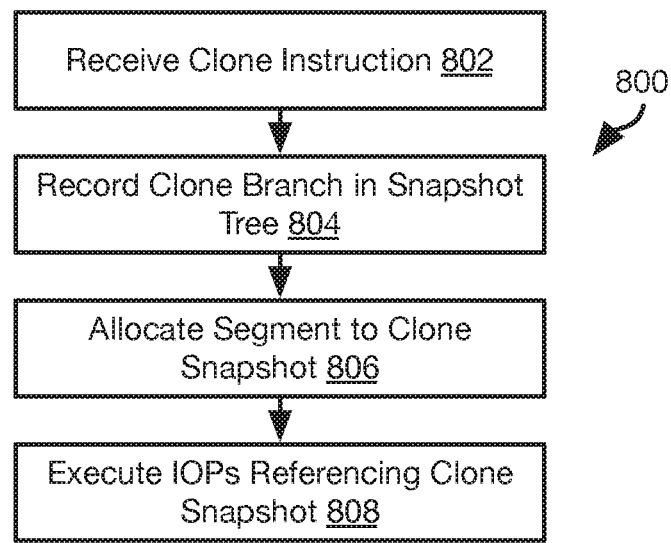
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone snapshot is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are clone snapshots.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
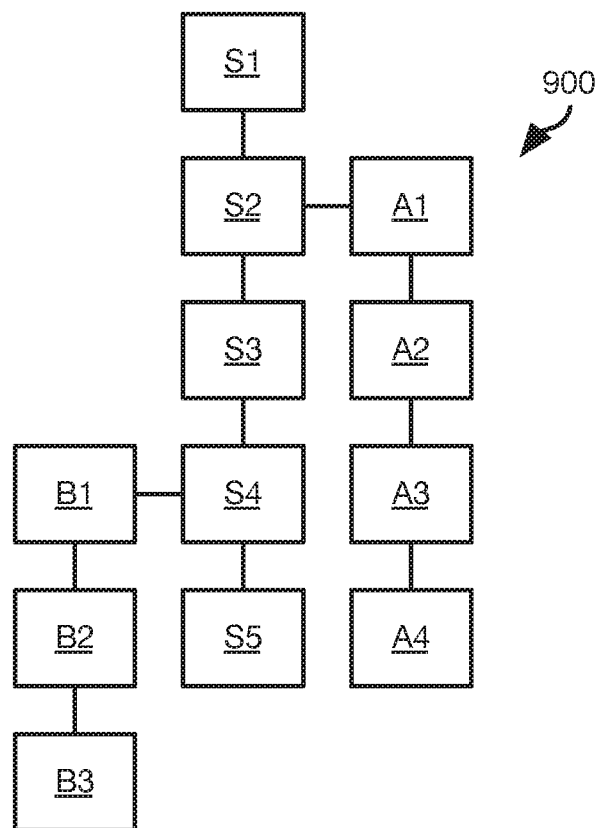
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone snapshot and branch to a node A1 representing the clone snapshot. In the illustrated example, a clone instruction was received with respect to the snapshot of node S2. This resulted in the creation of clone snapshot represented by node A1 that branches from node S2. Note node S3 and its descendants are also connected to node S2 in the hierarchy.

In some embodiments, the clone instruction may specify which snapshot the clone snapshot is of In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and clone snapshot represented by A1 would be created and node A1 would be added to the hierarchy as a descendent of node S2.

In some embodiments, the clone node A1, and possibly its descendants A2 to A4 (representing subsequent snapshots of the clone snapshot), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone snapshot, other principal snapshots of the storage volume may be created and added to represented in the hierarchy by one or more nodes S2 to S5. A clone may be created of any of these snapshots and represented by additional clone nodes. In the illustrated example, node B1 represents a clone snapshot of the snapshot represented by node S4. Subsequent snapshots of the clone snapshot are represented by nodes B1 to B3.

Referring again to FIG. 8, the creation of a clone snapshot on the storage node 106 may be performed in the identical manner as for any other snapshot, such as according to the methods of FIGS. 2 through 6. In particular, one or more segments 806 may be allocated to the clone snapshot on storage nodes 106 storing slices of the cloned storage volume and mapped to the clone snapshot. IOPs referencing the clone snapshot may be executed 808, such as according to the method 400 of FIG. 4.

In some instances, it may be desirable to store a clone snapshot on a different storage node 106 than the principal snapshots. Accordingly, the method 800 may include allocating 806 segments to the clone snapshot on the different storage node 106. This may be invoked by sending a new snapshot instruction referencing the clone snapshot (i.e., an identifier of the clone snapshot) to the different storage node 106 and instructing one or more compute nodes 110 to route IOPs for the clone snapshot to the different storage node 106.

The storage node 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
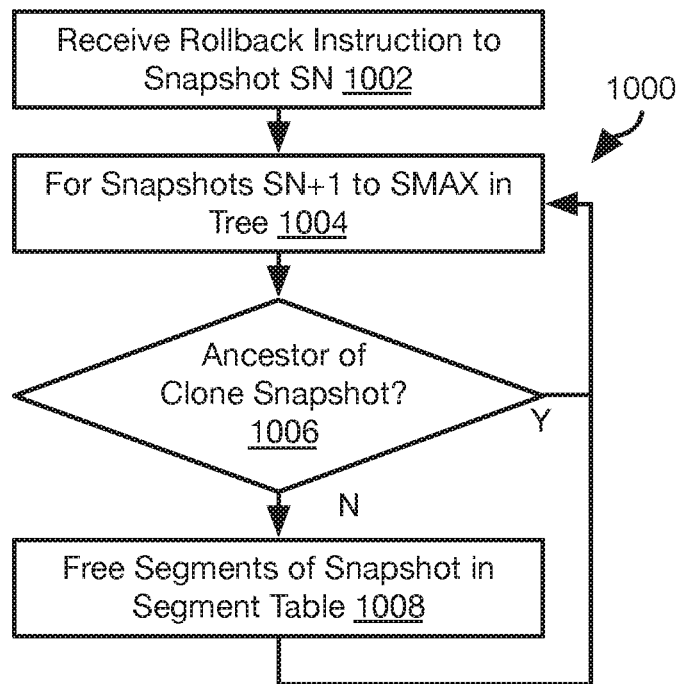
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone snapshots.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a clone snapshot. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a clone snapshot, then step 1008 is not performed and the snapshot and any segments allocated to it are retained.

Figure 11:
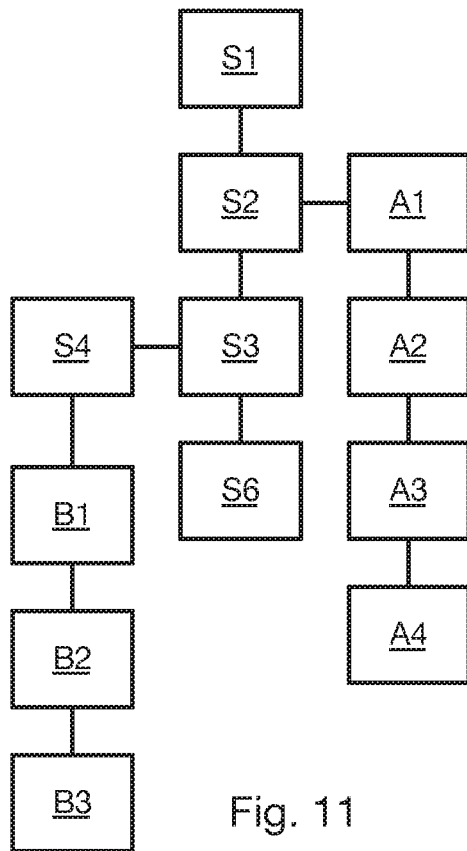
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone snapshots, clones of clone snapshots and descendent snapshots of any of these snapshots represented by nodes of a hierarchy. Accordingly, to roll back to a particular snapshot of a clone, the method 1000 is the same, except that descendants of the clone snapshot are treated the same as principal snapshots and clones of any of these descendants are treated the same as a clone snapshot.

Figure 12:
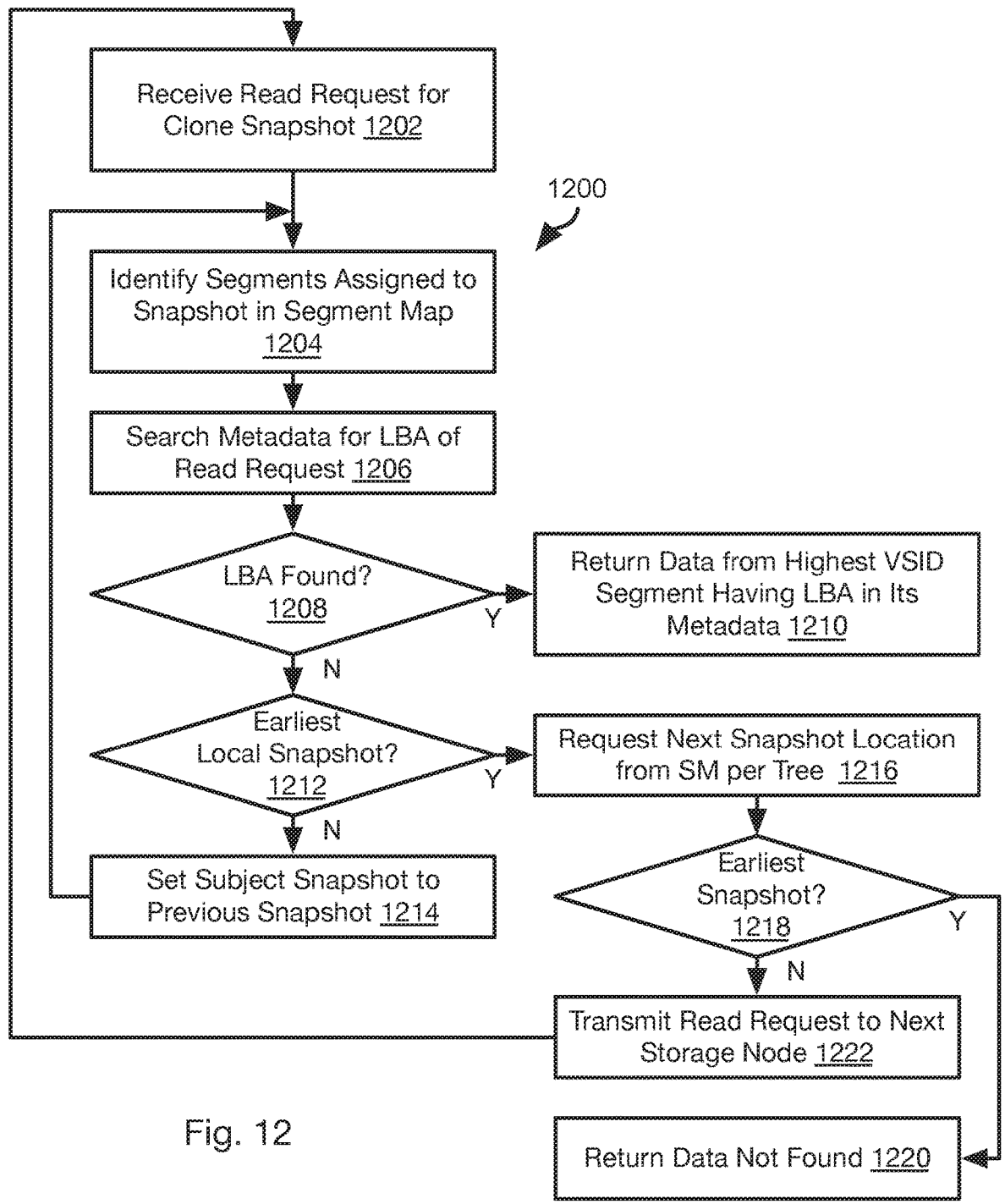
FIG. 12 is a process flow diagram of a method for reading from a clone snapshot in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 102 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found, the data from the highest numbered segment having the LBA in its metadata is returned, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
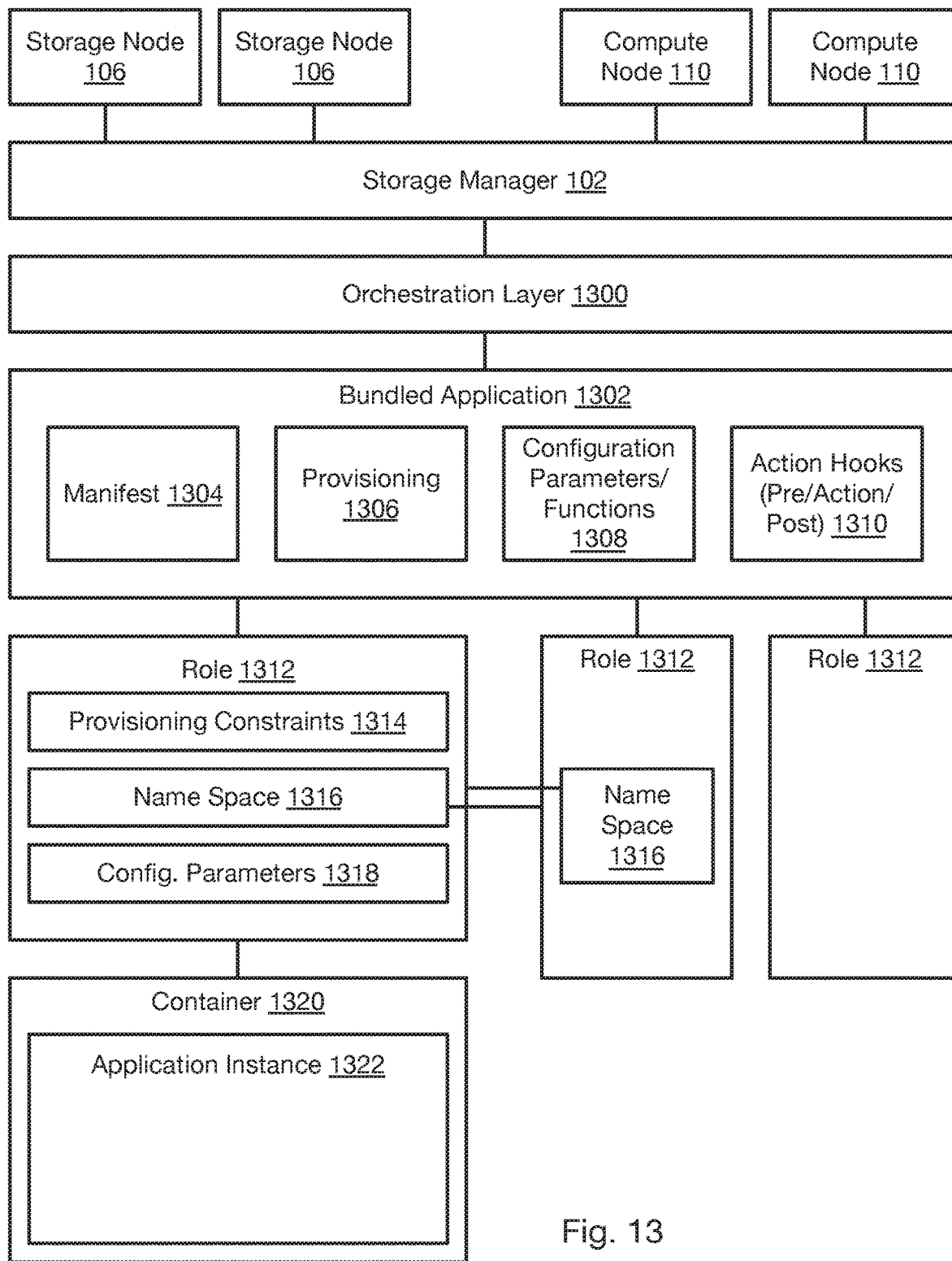
FIG. 13 is a schematic block diagram of components for implementing orchestration of multi-role applications in accordance with an embodiment of the present invention.

Referring to FIG. 13, storage according to the above-described methods and systems may be incorporated into an application-orchestration approach. In the illustrates approach, an orchestration layer 1300 implements a bundled application 1302 including a plurality of roles. In the following description, "bundled application" refers to a bundle of applications as implemented using the orchestration layer. A "role" is an instance of an executable that is managed by the orchestration layer as described herein as part of the bundled application. Accordingly, a "role" may itself be a standalone application, such as a database, webserver, blogging application, or any other application. Examples of roles include the roles used to implement multi-role applications such as CASSANDRA, HADOOP, SPARK, DRUID, SQL database, ORACLE database, MONGODB database, WORDPRESS, and the like. For example, in HADOOP, roles may include one or more of a named node, data node, zookeeper, and AMBARI server.

The orchestration layer 1300 may implement a bundled application 1302 defining roles and relationships between roles as described in greater detail below. The orchestration layer 1300 may execute on a computing device of a distributed computing system (see e.g., FIG. 1), such as on a compute node 110, storage node 106, a computing device executing the functions of the storage manager 102, or some other computing device. Accordingly, actions performed by the orchestration layer 1300 may be interpreted as being performed by the computing device executing the orchestration layer 1300.

The bundled application 1302 may include a manifest 1304 that defines the roles of the bundled application 1302, which may include identifiers of roles and possibly a number of instances for each role identified. The manifest 1304 may define dynamic functions define how the number of instances of particular role may grow or shrink depending on usage. The orchestration layer 1300 may then create or remove instances for a role as described below as indicated by usage and one or more functions for that role. The manifest 1304 may define a topology of the bundled application 1302, i.e. the relationship between roles, such as services of a role that are accessed by another role.

The bundled application 1302 may include provisioning 1306. The provisioning 1306 defines the resources of storage nodes 106 and compute nodes 110 required to implement the bundle. The provisioning 1306 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). As described below, these resources may be provisioned in a virtualized manner such that the bundled application 1302 and individual roles 1312 are not informed of the actual location or processing and storage resources and are relieved from any responsibility for managing such resources. In particular, storage resources may be virtualized by the storage manager 102 using the methods described above such that storage volumes are allocated and used without requiring the bundled application 1302 or roles to manage the underlying storage nodes 106 and storage device 108 on which the data of the storage volumes is written.

Provisioning 1306 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 1302 may further include configuration parameters 1308. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 1302 may further include action hooks 1310 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestration layer when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 1302 may define a plurality of roles 1312. Each role may include one or more provisioning constraints 1314. As noted above, the bundled application 1302 and roles 1312 are not aware of the underlying storage nodes 106 and compute nodes 110 inasmuch as these are virtualized by the storage manager 102 and orchestration layer 1300. Accordingly, any constraints on allocation of hardware resources may be included in the provisioning constraints 1314. As described in greater detail below, this may include constraints to create separate fault domains in order to implement redundancy and constraints on latency.

The role 1312 may define a name space 1316. A name space 1316 may include variables, functions, services, and the like implemented by a role. In particular, interfaces and services exposed by a role may be included in the name space. The name space may be referenced through the orchestration layer 1300 by an addressing scheme, e.g. <Bundle ID>.<Role ID>.<Name>. In some embodiments, references to the namespace 1316 of another role may be formatted and processed according to the JINJA template engine or some other syntax. Accordingly, each role 1312 may access the variables, functions, services, etc. in the name space 1316 of another role 1312 on order to implement a complex application topology. In some instances, credentials for authorizing access to a role 1312 may be shared by accessing the namespace 1316 of that role.

A role 1312 may further include various configuration parameters 1318 defined by the role, i.e. as defined by the developer that created the executable for the role. As noted above, these parameters 1318 may be set by the orchestration layer 1300 according to the static or dynamic configuration parameters 1308. Configuration parameters may also be referenced in the name space 1316 and be accessible (for reading and/or writing) by other roles 1312.

Each role 1312 may include a container 1320 executing an instance 1322 of the application for that role. The container 1320 may be a virtualization container, such as a virtual machine, that defines a context within which the application instance 1322 executes, facilitating starting, stopping, restarting, and other management of the execution of the application instance 1322. Containers 1320 may include any container technology known in the art such as DOCKER, LXC, LCS, KVM, or the like. In a particular bundled application 1302, there may be containers 1320 of multiple different types in order to take advantage of a particular container's capabilities to execute a particular role 1312. For example, one role 1312 of a bundled application 1302 may execute a DOCKER container 1320 and another role 1312 of the same bundled application 1302 may execute an LCS container 1320.

Note that a bundled application 1302 as configured in the foregoing description may be instantiated and used or may be saved as a template that can be used and modified later.

Figure 14:
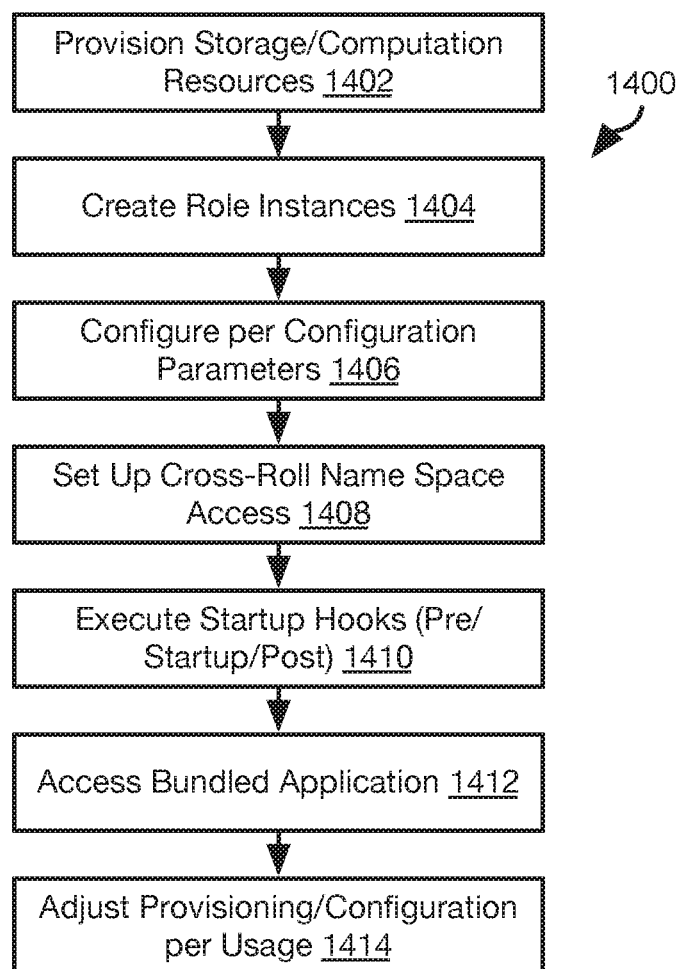
FIG. 14 is a process flow diagram of a method for orchestrating the deployment of a multi-role application in accordance with an embodiment of the present invention.

FIG. 14 illustrates a method 1400 for executing a bundled application 1302 using the orchestration layer 1300. The method 1400 may include provisioning 1402 storage and computation resources according to the provisioning 1306. This may include allocating storage volumes according to the storage requirements, assigning the storage volumes to storage nodes 106, and selecting a compute node 110 or storage node 106 providing the required computational resources (processor cores and memory).

The method 1400 may include creating 1404 role instances for the roles 1312 defined by the bundled application 1302. As described above, this may include creating a container 1320 and instantiating the application instance 1322 of the role 1312 within the container 1320. The order in which instances 1322 are created and started may be defined in the manifest 1304.

The method 1400 may include configuring 1406 each role according to the configuration parameters 1308, including executing any included functions to determine values for dynamic parameters. As noted above, starting a bundled application 1302 may further include setting up 1408 the roles 1312 to reference resources in the name space 1316 of another role 1312. For example, a webserver may be configured to access a database by referencing configuration parameters and services implemented by the database.

The method 1400 may further include executing 1410 any hooks 1310 defined for the initial startup of the bundled applications. Accordingly, pre-startup, startup, and post startup hooks may be executed. Some or all of the functions of steps 1402-1410 may be defined as part of the pre-startup hook. Other functions may also be performed prior to steps 1402-1408 as defined by a pre-startup hook.

The actual commencement of execution of the instances 1322 of the bundled application 1302 may be performed in an order specified by the startup hook and may include performing any attendant functions of these instances 1322 as specified by the startup hook. Following startup, one or more other actions may be performed as specified by the developer in the post-startup hook. These actions may invoke functions of the instances 1322 themselves or executed by the orchestration layer 1300 outside of the instances 1322, such as with respect to an operating system executing the containers 1320 for the instances 1322.

The bundled application 1302 may then be accessed 1412 in order to perform the programmed functionality of the application instances 1322. As usage occurs, processing resources will be loaded and storage may be filled. The method 1400 may further include adjusting 1414 provisioning according to this usage and may performed adjustment to configuration parameters of the roles 1312 according to this provisioning as defined by the provisioning 1306 and configuration functions 1308.

As noted above, instances of roles may also be created or removed according to usage. Accordingly, where indicate by the manifest 1304, instances 1322 for a role 1312 may be created according to steps 1402-1410 throughout execution of the bundled application 1302 as defined by one or more dynamic functions in the manifest 1304 for that role 1312.

Figure 15:
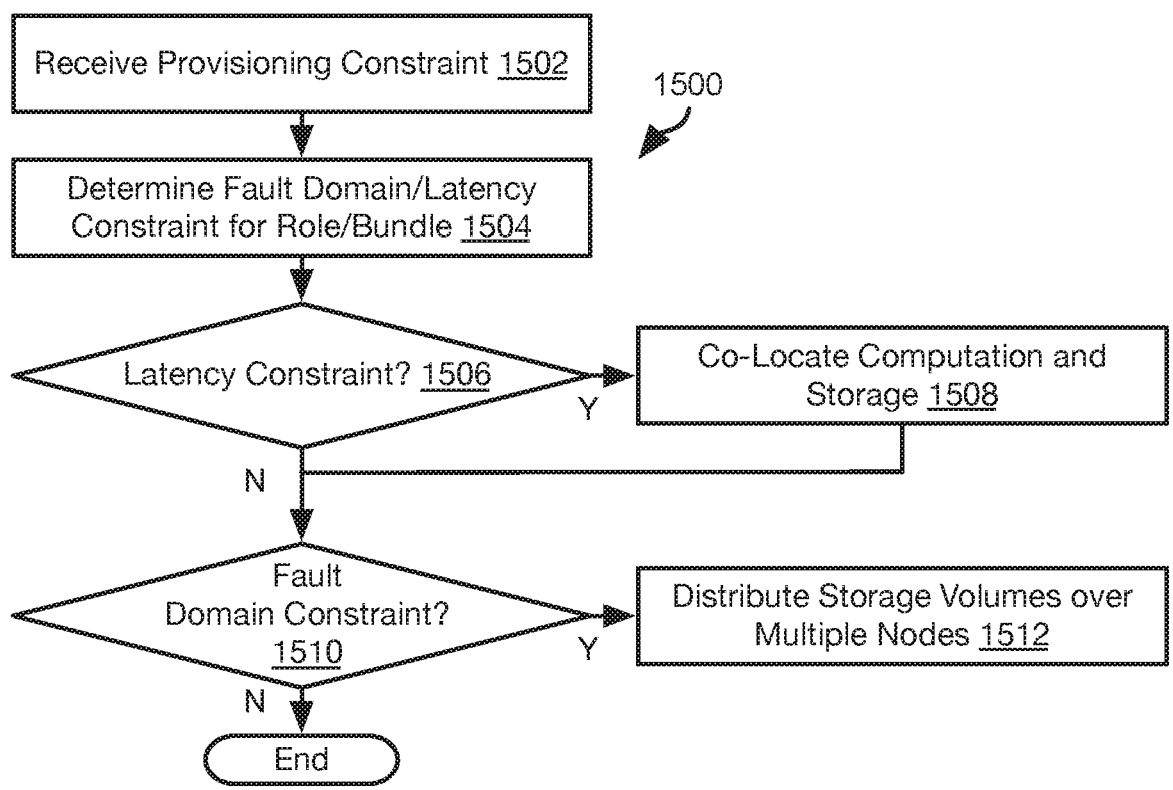
FIG. 15 is a process flow diagram of a method for implementing provisioning constraints in accordance with an embodiment of the present invention.

Referring to FIG. 15, the illustrated method 1500 may be used to implement provisioning constraints 1314 for a role 1312 or constraints for an entire bundled application 1302. The method 1500 may be executed by the orchestration layer 1300, storage manager 102, or a combination of the two.

The method 1500 may include receiving 1502 the provisioning constraint 1314 for one or more roles 1312 of the bundled application 1302 and determining 1504 whether the constraint 1314 specify one or both of a fault domain constraint and a latency constraint.

If a latency constraint is found 1506 to be included for a role 1312, then computational resources and storage resources to be provisioned for the role 1312 may be constrained 1508 to be co-located. In particular, latency may be specified in terms of (a) a minimum network delay, (b) a minimum network throughput, (c) an explicit constraint to place computation and storage resources in the same subnetwork, or (d) an explicit constraint to place computation and storage resources on the same node, i.e. a hybrid compute and storage node 110, 106 that performs the functions of both types of nodes with a single computer.

This constraint may be used by the orchestration layer to assign computing and storage resources to roles 1312 and storage volumes of the bundled application. For example, one or more storage volumes for the role 1312 will be assigned to storage nodes 106 that can either (a) meet the latency requirement with respect to compute nodes 110 allocated to the role 1312 (b) also provide the computational resources required for the role 1312.

The orchestration layer 1300 may include a resource manager in that accounts for all of the compute storage requirements and constraints and creates a resource allocation plan. This plan describes the virtual nodes (containers 1320) that make up the bundled application 1302. Each virtual node has allocations of processor cores, memory and storage volumes. The resource manager determines the compute host (compute node 110 or hybrid node) for each virtual node and a set of devices for each storage volume of the virtual node. The orchestration layer 1300 sends this mapping of the storage volumes to physical devices to the storage manager 102, which implements the storage allocation.

If the constraint for a role 1312 is found 1510 to include a fault domain constraint, then storage volumes for the role 1312 may be distributed 1512 among the storage nodes 106 of the distributed storage system 100 according to this requirement. For example, if storage volume B is a redundant (e.g., replica or backup copy) of storage volume A, the fault domain constraint may indicate this fact. Accordingly, the storage manager 102 may assign storage volume B to a different storage node 106 than storage volume A. Various degrees of constraint may be specified. For example, a fault domain constraint may simply require a different storage device 108 but not require a different storage node 106. A fault domain constraint may require that storage nodes 106 to which storage volumes are assigned by in separate subnetworks, different geographic locations, or have some other degree of separation. Similar fault domain constraints may be specified for roles 1312, which may be constrained to execute on different compute nodes 110 in order to provide redundant services and reduce downtime.

The provisioning constraints 1502 based on fault domains and/or latency may be combined with one or more other constraints. For example, a performance constraint (IOPs/second) for a storage node may be imposed. Accordingly, only those compute nodes meeting the performance requirement and the fault domain and/or latency requirements will be selected for provisioning.

As noted above, provisioning 1306 may define a processing requirement, such as a number of processing cores and an amount of storage for a role. Accordingly, compute nodes 110 may be selected at step 1508 such that both the latency requirement and processing requirement are met.

Figure 16:
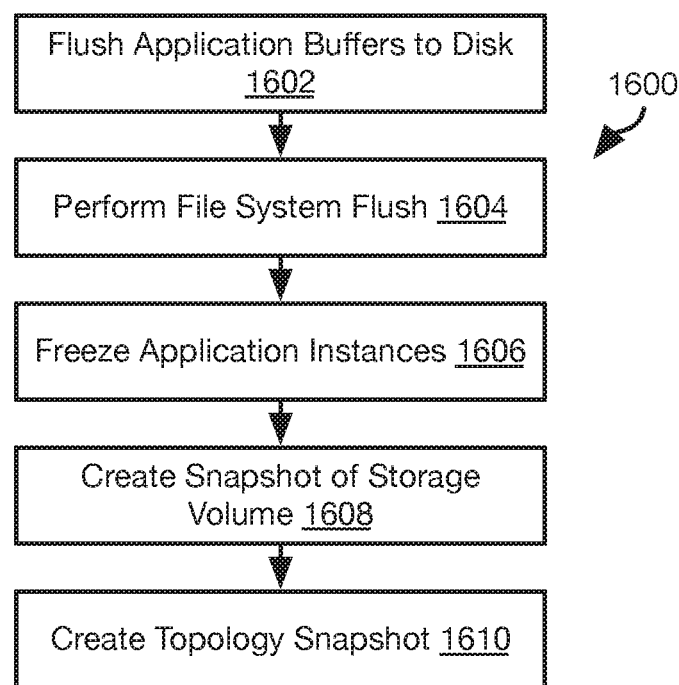
FIG. 16 is a process flow diagram of a method for creating a snapshot of a multi-role application in accordance with an embodiment of the present invention.

Referring to FIG. 16, the illustrated method 1600 may be executed by the orchestration layer 1302 with respect to a bundled application 1302 in order to create a snapshot of the bundled application 1302 that can be later restored (see the method 1700 of FIG. 17).

The method 1600 may include flushing 1602 application buffers to disk. In many instances, performance of an application is accelerated by maintaining data in a cache in memory, such that data in the cache is accessed and updated without requiring writing to a disk in many instances, as known in the art. Accordingly, this buffer may be flushed 1602 to disk by writing all valid data (i.e., not outdated due to a subsequent write) in the cache to the storage device 108 to which that data is addressed, e.g., to which the storage volume referenced by the data is assigned.

In a like manner, a file system flush may be performed 1604. Performing a file system flush may include ensuring that all IOPs pending to be performed by the file system have been executed, i.e. written to disk. As for step 1602, data written to a cache for the file system this is valid may be written to a storage device 108 to which the data is addressed, e.g., to which the storage volume referenced by the data is assigned.

The method 1600 may then include freezing 1606 the application instances 1322 of each role 1312. In particular, inasmuch as each instance 1322 is executing within container 1320, the containers 1320 for the roles 1312 may be instructed to pause execution of each instance 1322. This may include stopping execution and saving a state of execution of each instance 1322 (state variables, register contents, program pointers, function stack, etc.).

The method 1600 may further include creating 1608 a snapshot of storage volumes provisioned for the bundled application. This may include executing the method 200 of FIG. 2 or any of the above-described approaches for implementing a snapshot of a storage volume.

The method 1600 may further include creating 1610 a topology snapshot for the bundled application 1302. The topology of an application may include some or all of the following information as constituted at the time of executing step 1610 a listing of the roles 1312, which may include one or more instances 1322 of the same role 1322, relationships between application instances 1322 of roles 1312 (name space cross-references, configuration parameters), storage volumes assigned to roles 1312, or other information that describes the topology of the bundled application 1302. Applications may create metadata describing their state of operation. This data may also be saved as part of the topology snapshot.

After the snapshot is created according to the method 1600, the application instances may be resumed, with the application itself not suffering any down time in some embodiments. The bundled application 1302 may then continue to operate. If desired, the application may then be rolled back to the snapshot created according to the method 1600, as described below with respect to FIG. 17.

Figure 17:
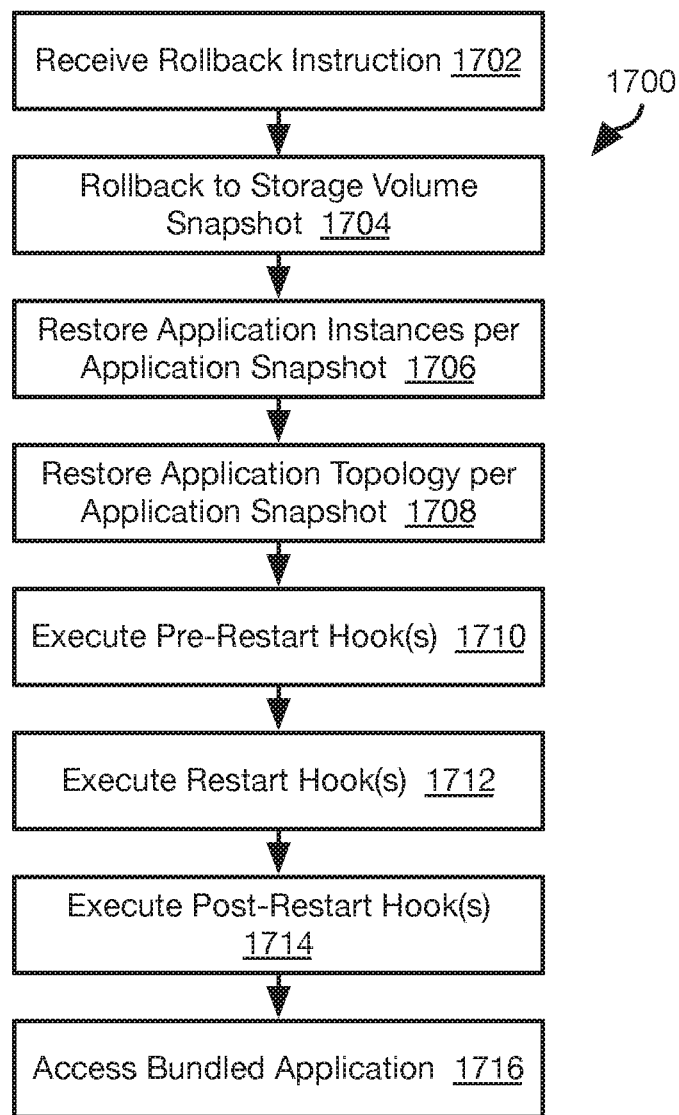
FIG. 17 is a process flow diagram of a method for rolling back a multi-role application in accordance with an embodiment of the present invention.

FIG. 17 illustrates a method 1700 for rolling back a bundled application 1302 to a snapshot, such as a snapshot created according to the method 1600. The method 1700 may be executed by one or both of the orchestration layer 1300 and the storage manager 102.

The method 1700 includes receiving 1702 a rollback instruction, such as from an administrator desiring to return to a stable version of the bundled application 1302. The remaining steps of the method 1300 may be executed in response to the rollback instruction.

The method 1700 may include rolling 1704 back storage volumes assigned to the bundled application 1302 to the snapshots created for the snapshot of the bundled application 1302 (e.g., at step 1608 of the method 1600). This may include executing the method 1000 of FIG. 10 or performing any other approach for rolling back a storage volume to a prior state.

The method 1700 may include restoring 1706 application instances from the application snapshot. As described above with respect to step 1606 of the method 1600, an application instance 1322 may be frozen. Accordingly, data describing a state of execution of the application instance 1322 may be reloaded into a container 1302 for that instance. If needed, the container for that application instance 1322 may be created and the instance 1322 loaded into it prior to loading the state of execution. This is particularly the case where the number of application instances has changed since the application snapshot was created.

The method 1700 may further include restoring 1708 the application topology saved for the bundled application at step 1610. Accordingly, relationships between application instances 1322 of roles 1312 (name space cross-references, configuration parameters), storage volumes assigned to roles 1312, or other information that describes the topology of the bundled application 1302 may be restored as it was at the time the application snapshot was created The method 1700 further include executing 1710, 1712, 1714 a pre-restart hook, restart hook, and post restart hook defined for the bundled application. As described above, each hook may be a routine defined by a developer to be executed for a particular action, restarting in this case. In step 1712, execution of the instances 1322 for the roles 1322 may be restarted, along with any other actions specified by the developer in the restart hook.

The bundled application 1302 as restored at steps 1704-1714 may then be accessed 1716 as defined by the programming of the application instances and the restored application topology.

Note that the snapshot of the bundled application 1302 may be restarted on different storage and compute nodes 106, 110 than those on which the bundled application 1302 was executing when the snapshot was created. Accordingly, the application snapshot may be restarted as a clone of the bundled application 1302 or moved to different hardware when executing the method 1700.

In some instances, the hooks of steps 1710, 1712, 1714 may be different when the application snapshot is being restarted as a clone as desired by a developer. For example, a developer may desire to scale the clone application to increase or decrease a number of databases, number of partitions of a database, or other aspect of the clone application. Accordingly, the hooks of steps 1710, 1712, 1714 may implement routines to implement this increase or decrease.

For example, some applications are able to automatically detect the number of partitions of a database. In such instances, some or all of the hooks 1710, 1712, 1714 may reduce the number of partitions in a database of the clone applications and rely on the application to discover this change. In other instances, some or all of the hooks 1710, 1712, 1714 may be programmed to configure an application to access the database with the reduced number of partitions where the application is unable to configure itself.

Figure 18:
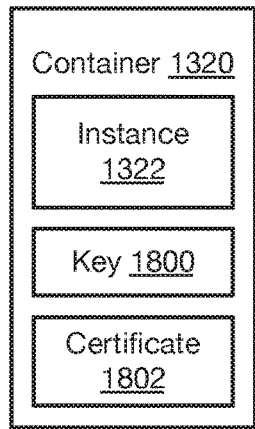
FIG. 18 is a diagram illustrating implementation of encryption and certification in a bundled application in accordance with an embodiment of the present invention.
Figure 18:
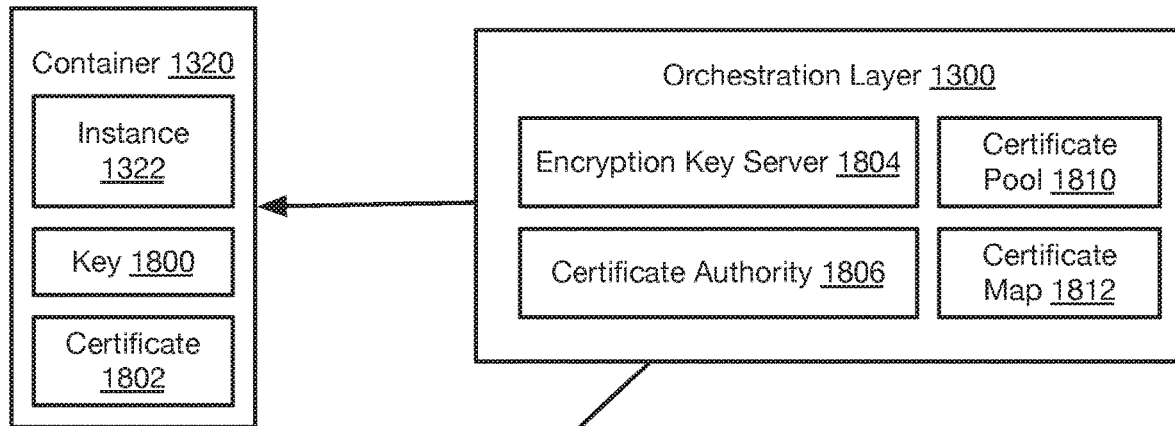

Referring to FIG. 18, in some implementations, application instances 1320 of a bundled application 1302 may communicate with one another using one or both of encryption and authentication. Accordingly, containers 1320 may be loaded with one or both of a key 1800 and a certificate 1802. The key 1800 may be one or more encryption keys including a public key, private key, or any other key for use according to any encryption approach known in the art. The certificate 1802 may be an authentication certificate such as is issued from a certification authority or other authentication authority. In some implementations, the functionality of a key 1800 and certificate 1802 may be implemented by a single data structure, such as a KERBEROS token or other data structure that functions as both an encryption key and an authentication certificate.

In some embodiments, the orchestration layer 1300 may host or access an encryption key server 2804 to generate encryption keys and provide the keys to the containers 1320 of a bundled application. The encryption key server 2804 may generate the keys according to any encryption algorithm known in the art.

The orchestration layer 1300 may also implement a certificate authority 1806 that both generates certificates 1802 and verifies their authenticity. The certificate authority 1806 may be implemented according to any approach known in the art for implementing certificate generation and verification. In other embodiments, a third party certificate authority 1806 may be used, such as VERISIGN or the like.

In implementations where a combined certificate and encryption key is used, e.g., KERBEROS, the encryption key server 1804 and certificate authority 1806 may be implemented by single token generation system, such as a KERBEROS server, i.e. a Key Distribution Center (KDC).

In some embodiments, the orchestration layer 1300 may host or access a certificate pool 1810. Certificates may then be generated and reused by various containers 1320 of a bundled application. A certificate map 1812 may record the assignment of a certificate to a container identifier or to a node (storage node 106, compute node 110, hybrid node) of a distributed computing system. In some approaches, a certificate may be tied to a domain or domain name. For example, the domain or domain names for which a certificate is valid may be defined using a wild card character, e.g., domain.*, or other regular expression. Accordingly, a certificate of the pool 1810 may be assigned to any of the containers or nodes having names within the domain to which the certificate is tied. Where KERBEROS is used, a token pool may be maintained and tokens assigned from it in a similar manner. Likewise, the tokens of the pool may be tied to a domain or domain name using a wild card designation or other regular expression.

Figure 19:
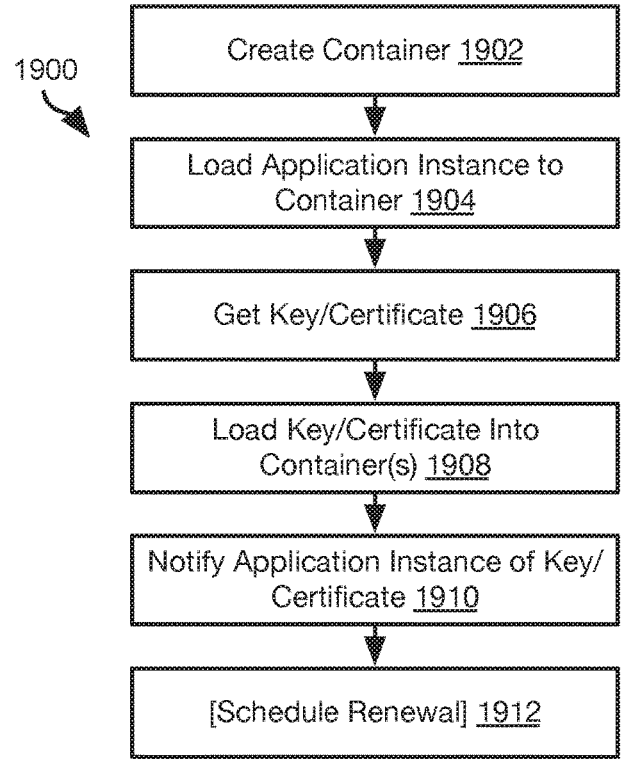
FIG. 19 is a process flow diagram of a method for providing encryption tokens and authentication certificates in accordance with an embodiment of the present invention.

FIG. 19 illustrates a method 1900 for using encryption keys, certificates, and/or tokens in a bundled application 1302 implemented using the orchestration layer 1300. The method 1900 may be repeated for some or all of the containers and/or storage nodes provisioned to a bundled application 1302.

The method 1900 may include creating 1902 a container 1320 and loading 1904 an application instance 1322 into the container. In some embodiments, a single combined image may include a container image loaded with the application instance 1322. Accordingly, steps 1902 and 1904 may include loading such a combined image onto a computing device (e.g., compute node 110 or hybrid node) as directed by the orchestration layer 1300 implementing the bundled application 1302.

The method 1900 may further include getting 1906 some or all of an encryption key, authentication certificate, and a KERBEROS token ("the data structures"). Some or all of these data structures may then be loaded 1908 into the container 1320 from step 1902, such as by loading some or all of these data structures into the combined image that is subsequently loaded onto the computing device. Alternatively, this step may be performed after the container 1320 and application 1322 are loaded onto the computing device. For example, an agent on the computing device may request the encryption key, certificate, and/or token after steps 1902 and 1904 are executed.

The method 1900 may further include notifying 1910 the application instance 1322 of the encryption key, authentication certificate, and/or KERBEROS token. This may include modifying one or more parameters of the application to refer to these data structures or calling a function of the application dedicated to configuring an application to use such data structures. Step 1910 may be performed before or after the container 1320 and the loaded application instance 1322 begin execution, such as part of a pre- or post-creation hook or a pre- or post-start hook for the role 1312 to which the container 1320 and application instance 1322 belong.

In some instances, an encryption key, certificate, or KERBEROS token may be set to expire after an expiration period. Accordingly, the application instance 1322 or agent executing on the computing device may schedule 1912 renewal prior to elapsing of this expiration period.

Storage nodes 106, compute nodes 110, and hybrid nodes provisioned to a bundled application 1302 may obtain some or all of an encryption key, certificate, and KERBROS token from the orchestration layer 1300 in the manner described above and use one or more of these data structures when communicating with the containers 1320 of the bundled application 1302.

Figure 20:
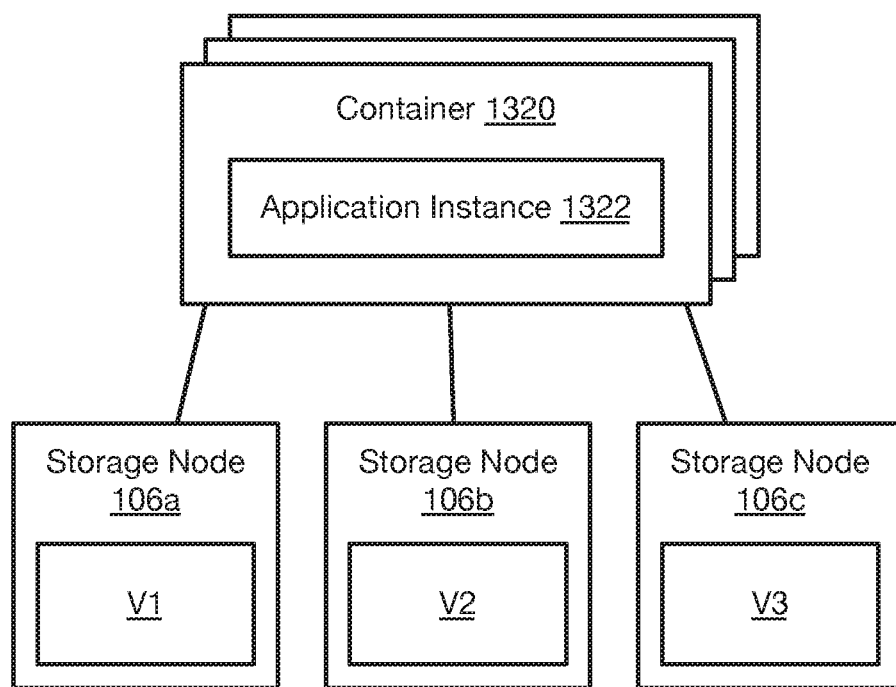
FIG. 20 is a diagram illustrating an application having multiple storage volumes mounted thereto.

Referring to FIG. 20, in some implementations, one or more containers 1320 hosting application instances 1320 implement a bundled application 1302. The application instances 1322 may implement redundancy, such that the creation, syncing, and restoration of replicas of data is managed by the application instances 1322, rather than being managed by the storage manager 102. Accordingly, multiple storage nodes 106a-106c may host storage volumes V1, V2, and V3, respectively, where V1, V2, and V3 are all replicas of the same data. The allocation, creation, and access of the storage volumes V1, V2, and V3 may still be managed by a storage manager 102 and orchestration layer 1300 as described hereinabove. However, the replication functions are shifted to logic within the bundled application 1302.

Figure 21:
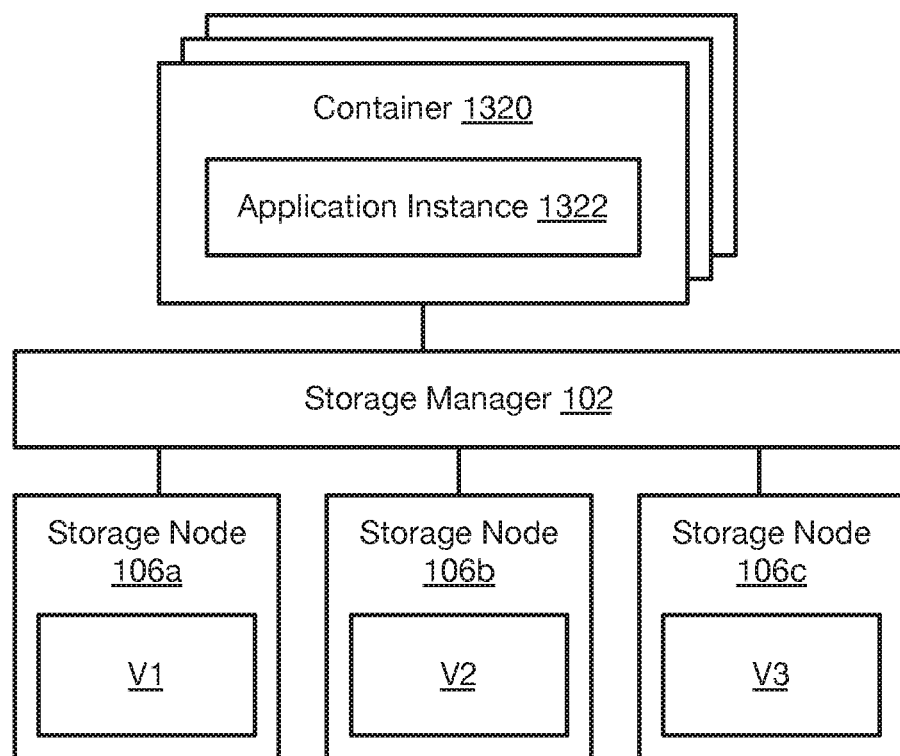
FIG. 21 is a diagram illustrating an application with a replicated storage volume mounted thereto.

Referring to FIG. 21, in another implementation, containers 1320 of a bundled application 1302 may mount a storage volume that has replicas V1, V2, and V3 on storage nodes 106a-106c. However, creation, syncing, and restoring of replicas is managed by the storage manager 102. Accordingly, only a single storage volume is mounted to the containers 1320 of the bundled application that corresponds to all of the replicas V1, V2, and V3. The storage manager 102 will therefore perform each write operation on all of the replicas V1, V2, V3 before permitting acknowledgment of the write operation. Read operations will be performed on one of the replicas V1, V2, V3 that is designated as a primary replica.

Figure 22:
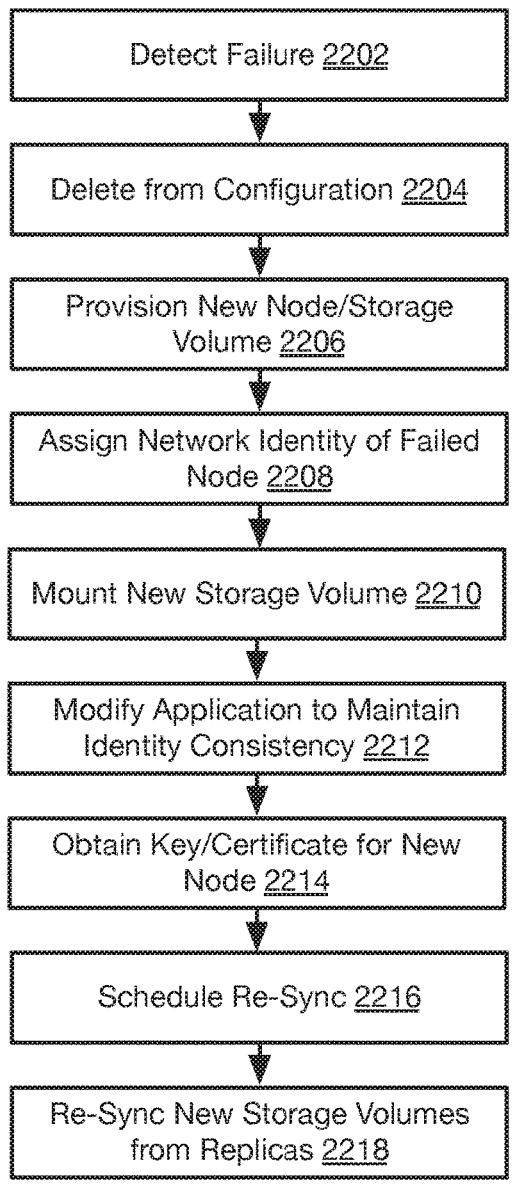
FIG. 22 is a process flow diagram of a method for performing application-directed storage volume repair in accordance with an embodiment of the present invention.

FIG. 22 illustrates a method 2200 for repairing a storage volume for the configuration of FIG. 20 wherein replication is managed by the bundled application 1302.

The method 2200 may include detecting 2202 failure of a storage node, for example storage node 106c in FIG. 20. Detecting failure may include detecting IOPs having latency exceeding a threshold, loss of network connectivity, a message from the node 106c indicating failure, or failure to receive a notification of operational status from an agent executing on the node 106c for a threshold period of time. Detecting 2202 failure may be performed by the storage manager 102 or by an application instance 1322 of the bundled application and reported to the storage manager 102 or orchestration layer 1300.

The method 2200 may include deleting 2204 the storage node 106c from a configuration for the bundled application 1302, i.e. from resources allocated to the bundled application 1302 by the orchestration layer 1300 and/or storage manager 102.

The method 2200 may include provisioning 2206 a new storage node and a new storage volume to replace storage node 106c and storage volume V3. This may be performed by the storage manager 102 and/or orchestration layer 1300. For example, any provisioning constraints 1314 may be provided by the orchestration layer 1300 to the storage manager 102, which then selects a new storage node 106 to replace storage node 106c.

The method 2200 may further include assigning 2208 a network identity to the new storage node 106 that is the same as the failed storage node 106c, such as by either the orchestration layer 1300 or storage manager 102. Step 2208 may include assigning an identifier to the new storage volume that is the same as the storage volume V3.

The new storage volume may then be mounted 2210 by the storage manager 102 and/or orchestration layer 1300 to one or more containers 1320 of the bundled application 1302 to which the volume V3 of the failed node was mounted.

Although the new storage node and new storage volume may be given the same identities as the failed storage node 106c and the storage volume V3, mounting of the new storage volume may invoke logic of the bundled application 1302 that perceives the new storage volume as being different from the failed storage volume V3. Accordingly, the bundled application 1302 may be modified 2212 to maintain consistency. Accordingly, parameters of one or more application instances 1322 of the bundled application 1302 may be modified to restore the application to a state indicating that the new storage volume is the same as the failed storage volume V3. For example, this logic may be coded by a developer in a post-repair hook that is invoked by the orchestration layer 1300 following repair, such as by executing the post-repair hook in the node executing the container 1320 for a particular application instance to which the new storage volume is mounted.

For example, in KAFKA, "brokers" are implemented. When a new broker comes online, it is assigned a new broker ID. Accordingly, in this example, when the new storage volume is mounted, a KAFKA application may be modified to assign the same broker ID to the new storage volume as was assigned to the failed storage volume.

The method 2200 may further include performing steps required to enable the new storage node to communicate with the bundled application, such as by obtaining 2214 one or more of an encryption key, a certificate, and a KERBEROS token or the like and assigning them to the new storage node. This may be performed in the manner described above with respect to FIG. 19. In particular, a key, certificate, or KERBEROS token may be obtained from a token or certificate pool 1810, such as the same key, certificate, and/or KERBEROS token that was assigned to the failed node. In particular, where a key, certificate, or token is associated with a host name, then these will continue to function correctly for the new storage node inasmuch as it is assigned to the same network identity as the failed node.

The method 2200 may then include scheduling 2216 syncing of the new storage node with the other storage nodes V1 and V2 and performing 2218 resyncing. This may be performed according to the native functionality of the bundled application 1302. In particular, upon mounting of the new volume, the bundled application will determine that it does not contain a current copy of the data contained in the other storage volumes V1 and V2 and will therefore schedule resyncing or begin resyncing immediately.

Note that a storage node may have multiple storage volumes stored thereon. Accordingly, steps 2206-2218 may be performed for each storage volume stored on the failed node. Note also that storage volumes may be assigned to storage nodes in slices. Accordingly, slices may be repaired in the same manner as for storage volumes described for the method 2200.

One example application of the method 200 is using MONGODB (MongoDB). In particular, upon mounting the new volume to a container of a MongoDB application, the orchestration layer 1300 may issue an express resync instruction to the MongoDB application to resync the new volume to the remaining replicas V1 and V2.

Figure 23:
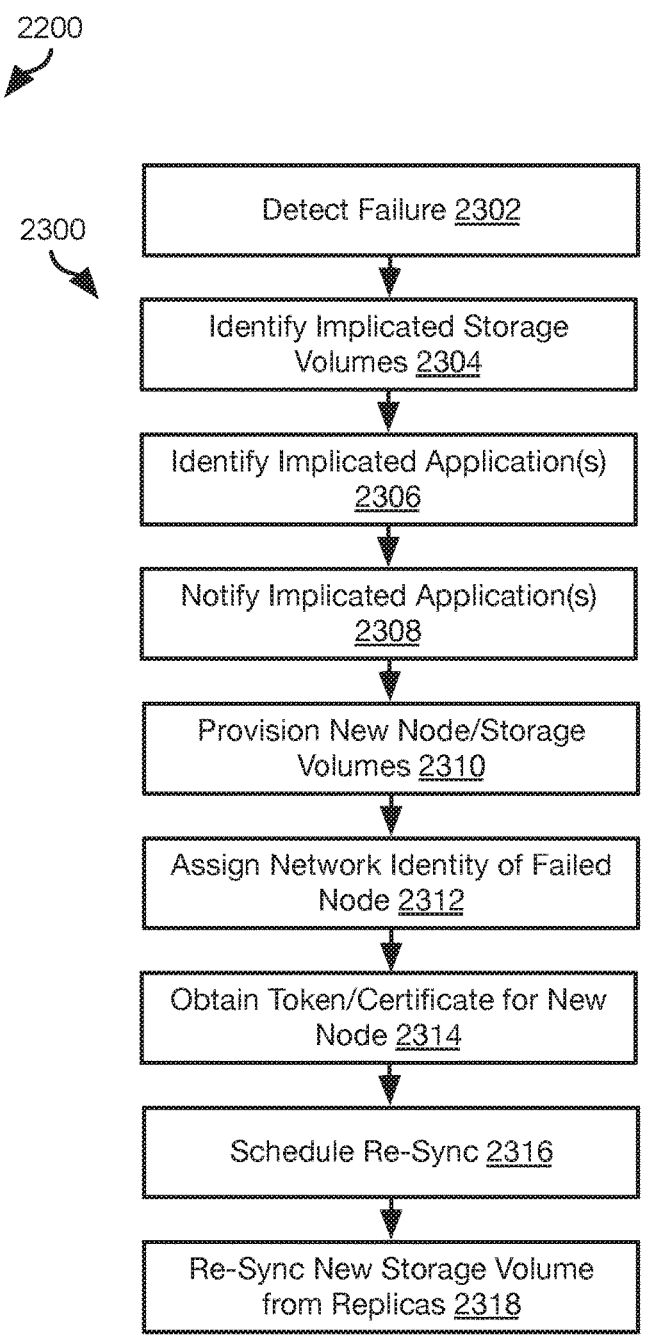
FIG. 23 is a process flow diagram of a method for performing repair of a replicated volume in accordance with an embodiment of the present invention.

FIG. 23 illustrates a method 2300 for repairing a storage volume in the configuration shown in FIG. 21. The method 2300 may include detecting 2302 failure of a storage node, such as detecting failure of storage node 106c as described above with respect to step 2202.

The method 2300 may further include identifying 2304 those storage volumes implicated by the failure. In particular, any storage volume having one or more slices stored on the failed node 106c may be identified, such as using the volume maps 300 for the storage volumes that list the node ID 302 of each slice of a storage volume.

The method 2300 may further include identifying 2306 one or more implicated applications. In particular, each bundled application 1302 having one of the implicated storage volumes provisioned therefor by the orchestration layer 1300 may be identified. In particular, the orchestration layer 1300 may maintain a mapping upon allocation of a storage volume that maps an identifier of the storage volume to an identifier of the instance of a bundled application 1302 to which the storage volume is allocated. Accordingly, the implicated application 1302 instance may be identified by the orchestration layer 1300 using this mapping.

The method 2300 may include notifying 2308 the implicated applications. For example, a message indicating failure of the implicated storage volumes of a bundled application 1302 may be transmitted to a component of that application, such as in the form of a system error. The bundled application 1302 may then process the notification according to its native programming, which may include suspending issuing of IOPs with respect to the implicated storage volumes until they are repaired. In some instances, application logic may require user confirmation or a user request to repair a storage volume before repair is performed. Other application logic may require that repair be performed at a certain level of granularity, for example, upon failure of a node storing a slice of a storage volume, repair of the entire storage volume may be constrained to be performed, rather than simply repairing the slice. In either case, the subsequent steps of the method 2300 may be performed subject to such constraints or in response to a request from an application or user of an application.

The method 2300 may further include provisioning 2310 one or more new storage nodes and new storage volumes for each of the implicated storage volumes. Note that the storage volumes and slices of storage volumes formerly stored on the failed node need not be reassigned to the same new storage node. Accordingly, for each implicated storage volume, or implicated slice of a storage volume, that storage volume or slice may be assigned to a storage node. This may include making the assignment subject to any provisioning constraints 1314 of the bundled application to which the implicated storage volume or slice is allocated.

For each new storage node and new storage volume, or slice of a storage volume, allocated at step 2310, the method 2300 may include assigning the new storage volume the network identity of the failed node. Where multiple storage nodes are selected for storing the implicated storage volumes and slices of storage volumes, this step may be eliminated. In some embodiments, a storage volume or slice of a storage volume may be implemented by a container 1320 executing on a storage node 106c. In such instances, the container for the newly created storage volumes or slices of a storage may be assigned the same container identifier as the container 1320 that was implementing the corresponding storage volumes or slices of a storage volume on the failed node.

Step 2312 may further include the newly assigned storage volumes and slices of storage volumes the same identifiers as the storage volumes and slices of storage volumes they were provisioned 2310 to replace.

To enable encrypted and/or authenticated communication, the nodes provisioned with a storage volume or slice of a storage volume may also obtain 2314 some or all of an encryption key, certificate, and KERBEROS token from the orchestration layer 1300 for communication with containers 1320 of the bundled application 1302 to which the storage volume or slice of a storage volume is allocated. This may be performed in the same manner as for step 2214 of the method 2200.

The method 2300 may further include scheduling 2316 resyncing of any newly provisioned storage volumes or slices of a storage volume and performing 2318 resyncing. Note that these steps may be performed in the same manner as for steps 2216 or 2218. However, the performance of steps 2316 and 2318 may be managed by the storage manager 102 rather than logic within the bundled application in some embodiments. In particular, the storage manager 102 may manage the copying segments to the newly provisioned storage volumes or slices of a storage volume from one or more replicas corresponding to the newly provisioned storage volumes or slices of a storage volume.

Figure 24:
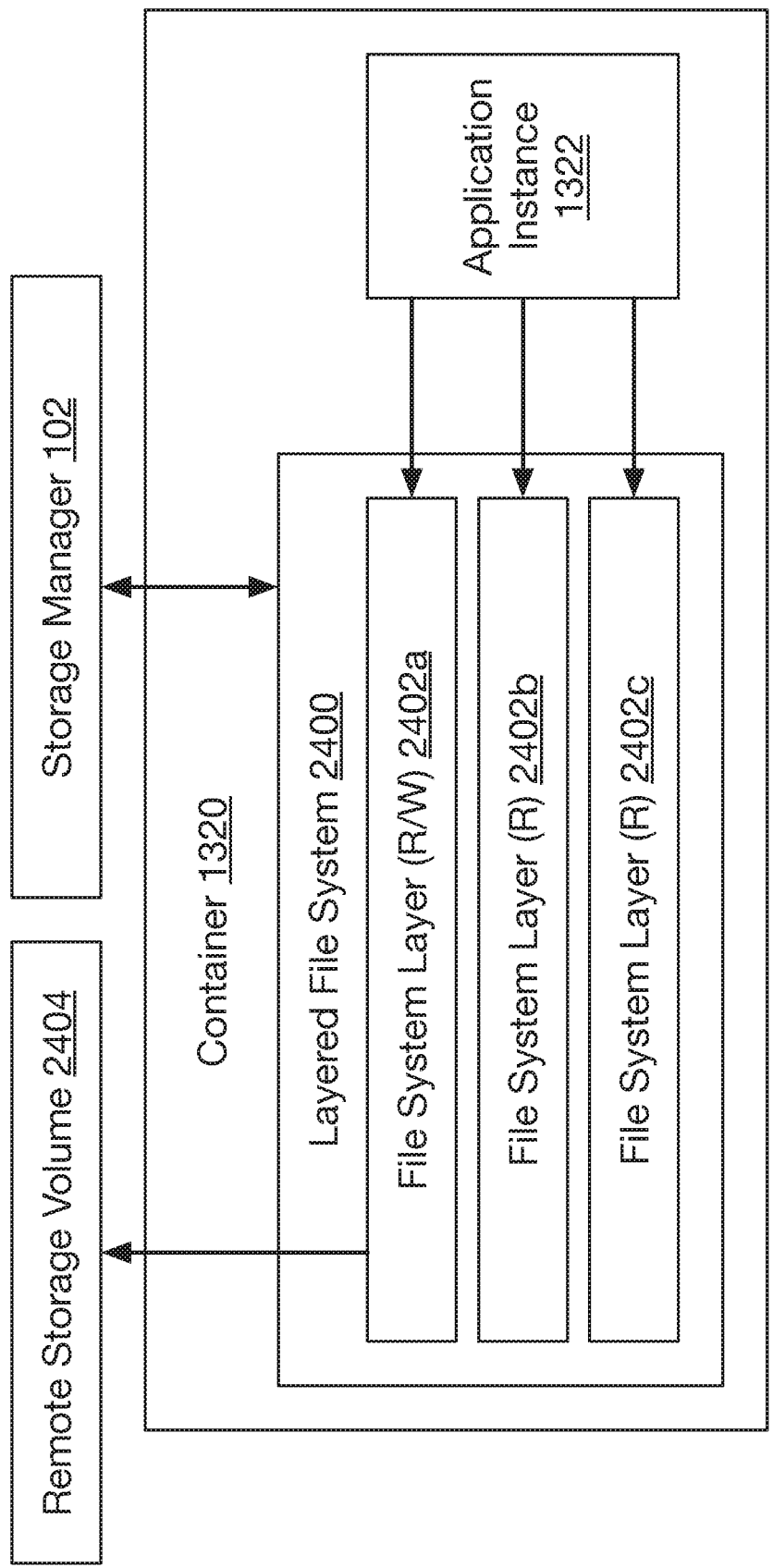
FIG. 24 is a diagram illustrating use of a layered file system in accordance with an embodiment of the present invention.

Referring to FIG. 24, as noted above, containers 1320 may be implemented as DOCKER containers. However, DOCKER containers are not particularly suited for implementing stateful applications in which some or all of the state of an application is stored in persistent storage. This may be a disadvantage, particularly where a snapshot of an application is to be create and used for rolling back or cloning (see discussion of FIG. 17).

In the illustrated approach, a DOCKER container 1320 is modified to use an external graph driver plugin for storing persistent data. In the illustrated embodiment, the graph driver plugin implements a layered file system 2400. In the illustrated implementation, the layered file system includes various layers 2402a-2402c that are combined with one another to define a file system as known in the art of graph driver plugins for use with DOCKER containers. In the illustrated embodiment, only one layer 2402a is a read/write (R/W) layer and the remaining layers are read only layers. The R/W layer 2402a may be configured to mount a remote storage volume 2404 implemented by a storage node 106 according to the methods described herein (see, e.g., FIGS. 1 through 7). As described above, the storage volume 2404 may be a virtualized storage volume that is implemented without the container 1320 having data regarding a storage node 106 or device 108 on which the storage volume is actually stored.

In this manner, any persistent data written or changed by an application instance 1322 executed by the container 1320 will be performed on the remote storage volume 2404. Accordingly, when a snapshot of the container 1320 is made or the container is moved to a different location, the persistent data may be copied or recreated using the remote storage volume. No tracking of changes or other awareness of the persistent state of the application instance 1322 is required in order to achieve this functionality due to the use of the remote storage volume 2404 to implement the R/W layer 2402a.

Figure 25:
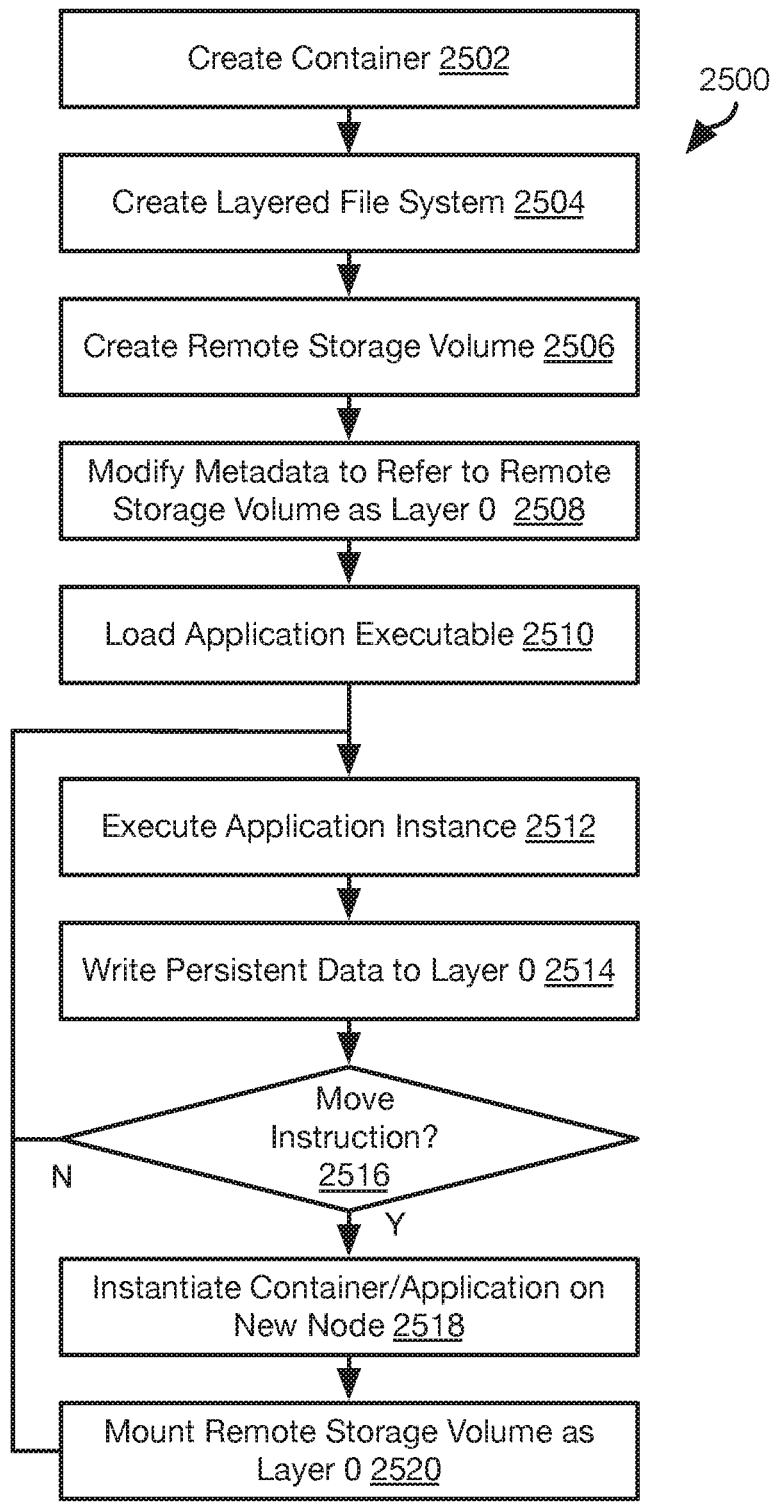
FIG. 25 is a process flow diagram of a method for implementing portable containers in accordance with an embodiment of the present invention.

FIG. 25 illustrates a method 2500 for using the architecture shown in FIG. 24. The method 2500 may be executed on a compute node 110 or hybrid node. The method 2500 may be executed as part of deployment of a bundled application 1300 in order to create and start a container 1320 on the compute node 110.

The method 2500 may include creating 2502 a container 1320, e.g. a DOCKER container, on the compute node 110 and creating 2504 a layered file system, such as by associating a graph driver plugin with the container 1320. A remote storage volume may also be created 2506, as described above with respect to FIGS. 1 through 7. Creating 2506 a storage volume may be performed by requesting allocation of a storage volume by the storage manager 102.

The method 2500 may include modifying 2508 metadata of the layered file system to refer to the remote storage volume as layer 0 (the R/W layer) of the layered file system.

An instance 1322 of an application executable may be loaded 2510 into the container 1320 as well. The application instance 1322 may be executed 2512, which may result in writing 2514 of persistent date data for the application instance 1322. These writes will be routed by the graph driver plugin to the remote storage volume and persistently stored therein.

If a move instruction is found 2516 to have been received, the method 2500 may include instantiating 2518 a new container at a new location, e.g., a different compute node. The container may be loaded with an instance 1322 of the executable application. The method 2500 may further include mounting 2520 the remote storage volume from step 2506 to the new container as layer 0 of the layered file system. This may include modifying the metadata for the new container as described above with respect step 2508. The state of the application instance 1322 may therefore be created using the data in the remote storage volume.

In some embodiments, the container to be moved may be frozen and copied to the new location, rather than creating a new container. In that case, a clone of the remote storage volume storing the persistent state data may be mounted to create a clone of the container.

The move instruction of step 2516 may be an instruction to move the application instance or be part of a process of cloning the application instance. In either case, execution of the move may be proceeded with creating a snapshot of the application as described above with respect to FIG. 16. Likewise, steps 2518 and 2520 may be executed as part of the rollback process of FIG. 17.

Figure 26:
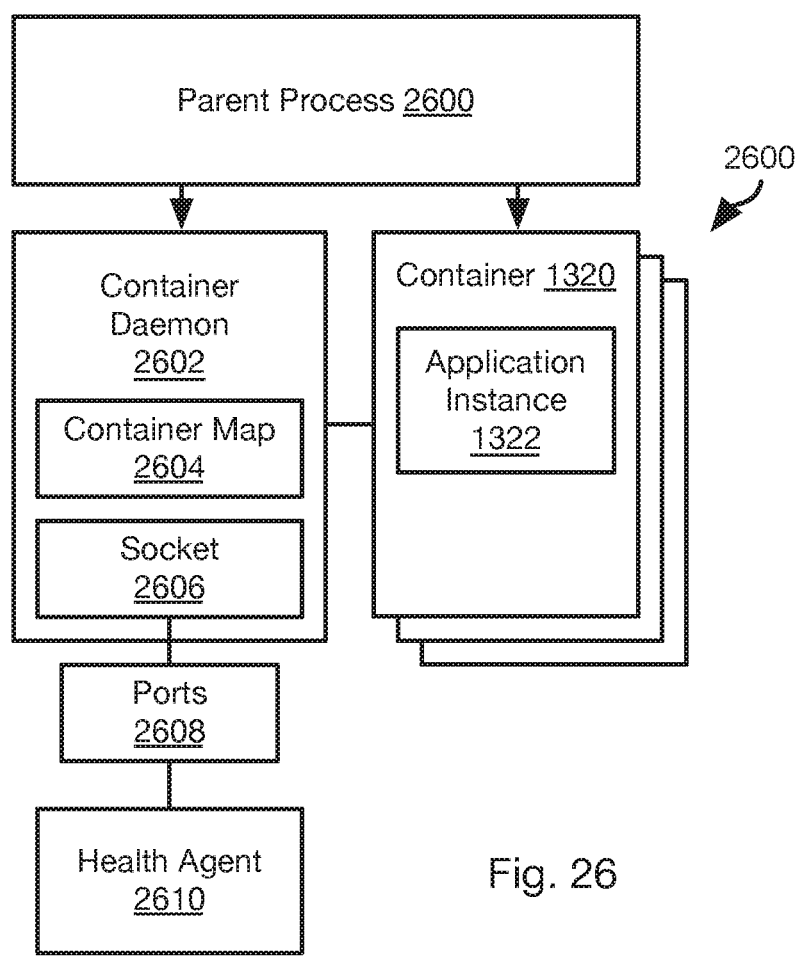
FIG. 26 is a diagram illustrating components for monitoring the functioning of containers on a node in accordance with an embodiment of the present invention.

FIG. 26 illustrates components 2600 for evaluating the state of operation of one or more containers 1320 executing on a node, such as compute node 110 or hybrid node ("the subject node").

For example, a process 2600 executing on the subject node may invoke execution of containers 1320. In some instances, a container daemon 2602 may execute within the process 2600 and invoke creation of the containers 1320 and also manage execution of the containers. For example, the container daemon 2602 may be a DOCKER daemon In some embodiments, the container daemon 2602 implements a socket 2606 to which remote and local processes may connect in order to communicate with application instances 1322 executing within the containers 1320 of the subject node. In some embodiments, the container daemon 2602 may maintain data describing the containers executing thereon, which is referred to herein as a container map. For example, the container map may map an identifier for each container 1320 of the subject node to one or more items of information such as an identifier of the application instance 1320 executing in the each container, numbers of one or more ports 2608 that the application instance 1322 listens to or is otherwise mapped to, a state of operation of the container (running, stopped, non-responsive, etc.), or other information.

In some embodiments, a health agent 2610 communicates with one or both of the container daemon 2602 and the containers 1320. For example, the health agent 2610 may obtain some or all of the data in the container map 2604. Accordingly, the health agent 2610 has a mapping between containers 1320 and the ports to which those containers 1320 are assigned. The health agent 2610 may execute on the same subject node as the process 2600, daemon 2602, and containers 1320. In other embodiments, the health agent 2610 executes on a different node.

Figure 27:
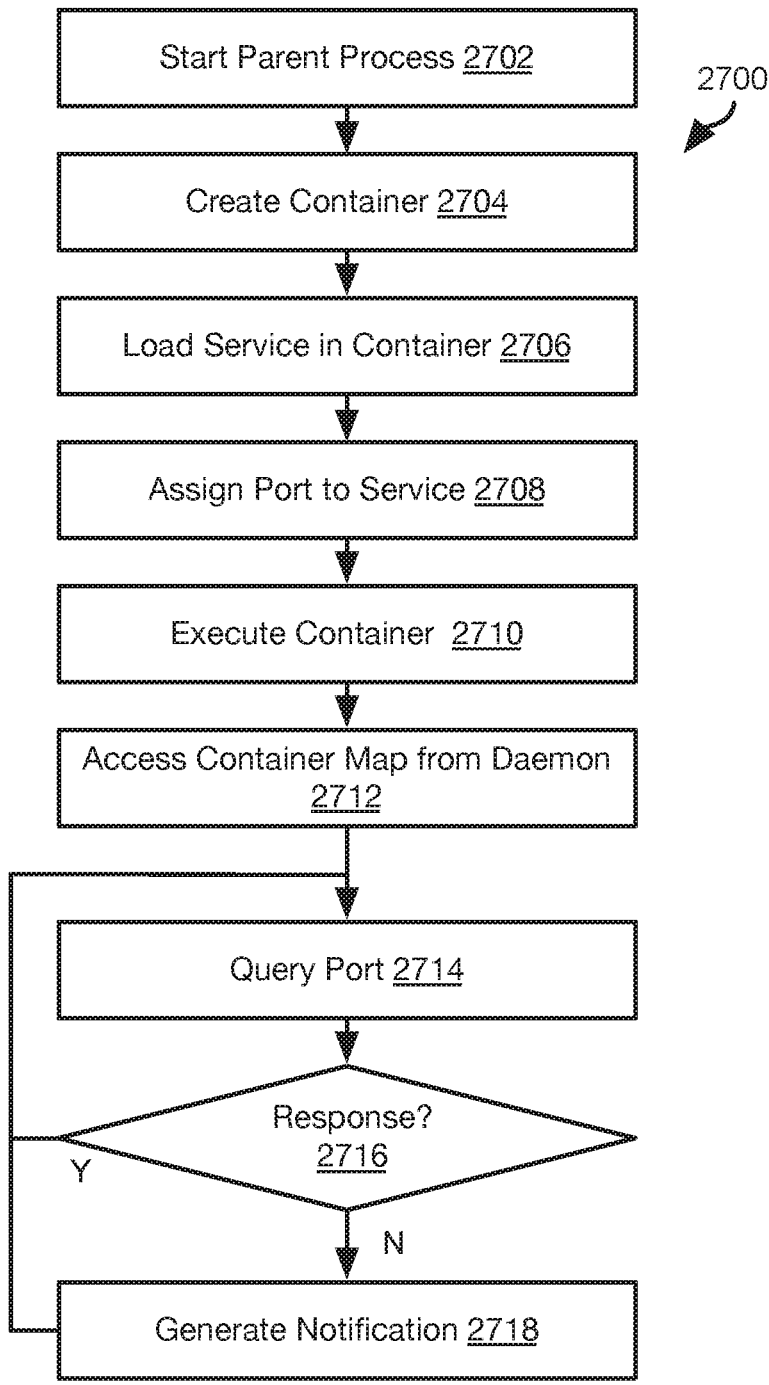
FIG. 27 is a process flow diagram of a method for monitoring the functioning of containers in accordance with an embodiment of the present invention.

Referring to FIG. 27, the illustrated method 2700 may be implemented using the components 2600 of FIG. 26 by the subject node. In particular, the method 2700 may be executed by the subject node in response to an instruction from the orchestration layer 1300 to create one or more containers 1320 on the subject node.

The method 2700 may include starting 2702 the parent process 2600, the parent process being an agent process for the orchestration layer 1300 or another process programmed to initiate creation of containers.

The method 2700 may then include creating 2704 one or more containers 1320 by the parent process. An application instance 1322 may be loaded 2706 into the containers either after the creation step 2704 or by being part of the container image instantiated at step 2704. The application instance 1322 may, for example, a network service such as SSH (secure shell), a component of a HADOOP cluster, a web server, or other network service. The method 2700 may further include assigning 2708 a port to the application instance 1322 and recording this assignment in the container map 2604.

The container 2710 may begin 2710 executing such that the application instance 1322 is available to process requests on its assigned port or perform other programmed functionality.

The health agent 2610 may access 2712 the container map 2604 in order to determine the port to which the application instance 1322 has been assigned. The health agent 2610 may periodically query 2714 the port assigned to the application instance 1322. The query may be a generic network ping that invokes returning of a response if the application instance 1322 is executing properly. The query may be specific to the service implemented by the application instance 1322, such as an attempt to establish a connection with a SSH server, a web page request from a web server, or other application specific request. In some instances, the application instance 1322 may define function calls for assessing its function. Accordingly, the health agent 2610 may issue such a function call to the port in such implementations.

If a response is found 2716 to have been received, then the application instance 1322 may be presumed to be functioning and no action is taken. In some instances, a message indicating correct functionality may be sent to the orchestration layer 1300 or to one or more application instance 1322 of the bundled application of which the application instance 1322 is a part. In some embodiments, a response from the application instance may indicate a fault, in which case, the result of the evaluation of step 2716 will be negative even though a response was received.

If no response was received or the response indicates a fault, the method 2700 may include generating 2718 a notification. The notification may be sent to the orchestration layer 1300 or to one or more application instance 1322 of the bundled application 1302 of which the application instance 1322 is a part. In some embodiments, the notification may be a user perceptible notification, such as an email or other type of notification that is viewable by a user.

Figure 28:
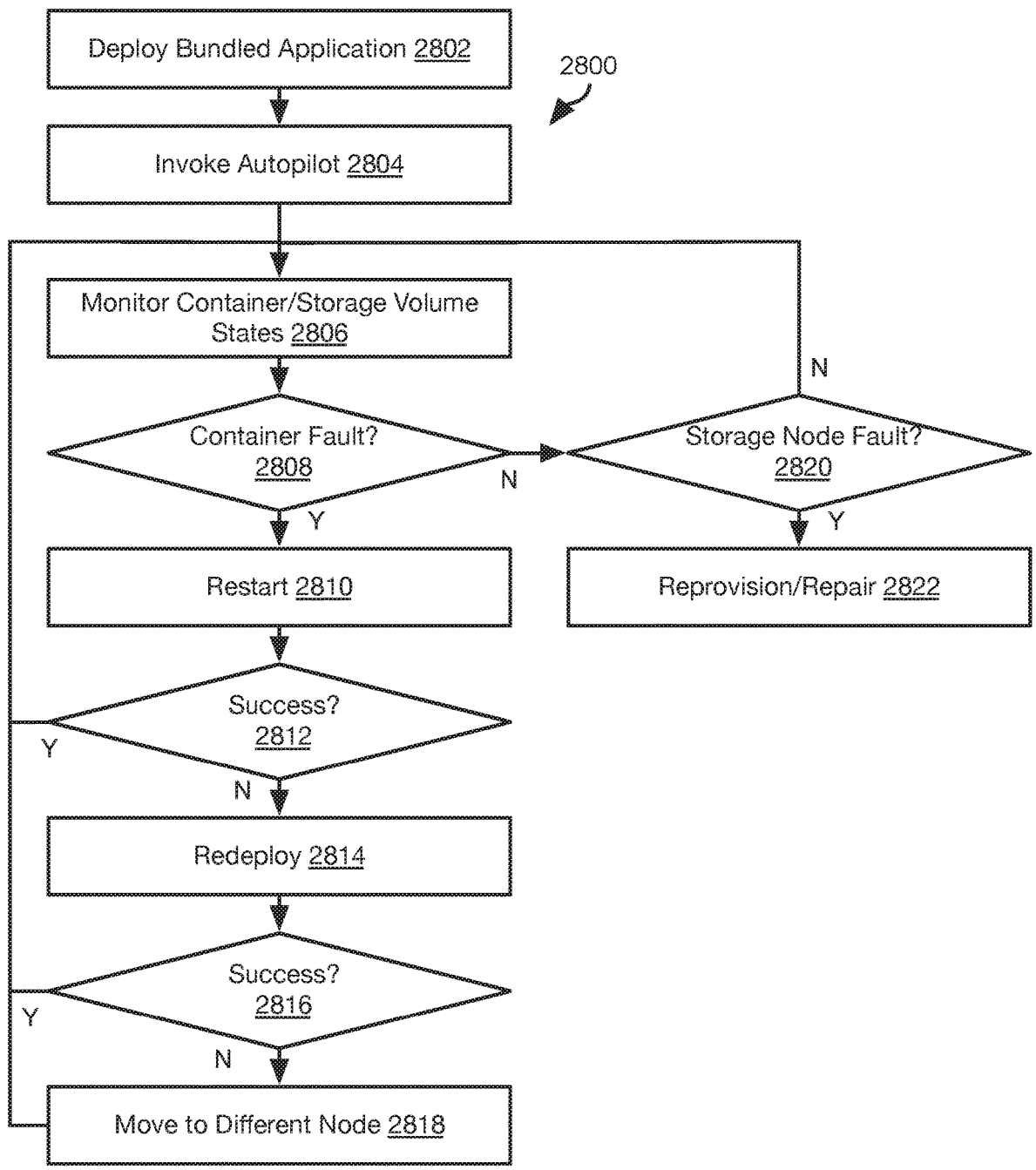
FIG. 28 is a process flow diagram of a method for maintaining a state of a bundled application in accordance with an embodiment of the present invention.

Referring to FIG. 28, the illustrated method 2800 may be executed by the orchestration layer 1300 in order to implement an "autopilot" that maintains a state of a bundled application 1302 after it has been either deployed or adjusted (increase or decrease in allocated storage, memory, processor cores, or containers). Accordingly, the method 2800 may be used to maintain the storage volumes and containers of a bundled application 1302 at state they were in at the time of starting of the autopilot.

The method 2800 may include deploying 2802 a bundled application according to the methods disclosed herein. Accordingly, after step 2802 one or more containers 1320 may be executing on one or more nodes (compute node 110 or hybrid node) and one or more storage volumes may be mounted to those containers 1320, with the storage volumes implemented by storage nodes 106, hybrid nodes, cloud storage, SAN (storage area network), NetApp, or some other approach. Step 2802 may be followed by automated or manual adjustment to the number of containers, storage volumes, allocated cores and memory for a container, or any other aspect of the deployment of a bundled application 1302 as described above.

The method 2800 may include invoking 2804 autopilot for the bundled application. The autopilot may be a component of the orchestration layer that monitors 2806 the states of the containers 1320 and possibly storage volumes of the bundled application. Monitoring the state of a container 1320 may include receiving notifications from the health agent 2610 according to the method 2700. Monitoring the state of a storage volume may include receiving notifications from an agent executing on a node implementing a storage volume or an interface to a storage volume, such as storage node 106 or hybrid node. In particular, the agent may be used to determine whether a disk of the node fails, the node fails to report a functioning status after a threshold timer period, the node is not accessible over a network, IOPs transmitted to the node have a latency that exceeds a threshold latency, or some other event occurs that indicates that the node is no longer functioning correctly.

If the result of step 2806 is found 2808 to indicate a fault in a container 1320, then the method 2800 may include instructing the node hosting the container 1320 to restart 2810 ("bump") the container. Restarting a container 1320 may be accompanied by any hooks (pre-restart, restart, post-restart hooks) defined by the bundled application for that role 1312 implemented by the container.

The method 2800 may include evaluating 2812 whether restarting successfully restored operation of the container 1320, e.g. the health agent 2610 reports that the container is executing properly or fails to indicate a fault. If so, then no further action is taken with respect to the container in some embodiments.

If restarting is not found 2812 to be successful, the method 2800 may include instructing the node executing the container to redeploy 2814 the container 1320. In particular, a new container 1320 may be created, loaded with the application instance 1322 in the former container, restored to the state of the former container, and started. For example, steps 2518-2520 of the FIG. 25 may be performed as described above.

If this is found 2816 to be successful, then no further action is taken with respect to the new container in some embodiments. If redeployment is not found 2816 to be successful, the container may be moved 2818 to a different node.

In particular, the step of moving may include evaluating any provisioning instructions and provisioning constraints of the bundled application for the role 1312 to which the container 1320 corresponds. In particular, this may include selecting a node having sufficient number of available cores and available memory for the container 1320 as specified by the bundled application 1302 and meets any additional constraints, such as:

Satisfies any fault domain ("anti-affinity") constraints such that the node selected is not the same node hosting another container 1320 of the bundled application 1302 that is in a different fault domain.

Satisfies any latency ("affinity") constraints such that the node selected is on the same node as a storage volume required to be co-located with the container (the storage volume may be moved to a new node to achieve this in some embodiments) or is otherwise in a required proximity (same node, rack, data center, etc.) to another resource (container, storage volume) of the bundled application 1302 as specified by the bundled application 1302.

Once a node is selected, it may be provisioned by the orchestration layer 1300 to the bundled application 1302 and a new container created on the new node that is then restored to the state of the failed container. This may be performed using the approach of FIGS. 24 and 25 in some embodiments. Provisioning the new node may include allocating processor cores and memory for use by the new container and notifying the bundled application of the new container. If the container is moved, step 2818 may include mounting a storage volume to the new container, such as the same container that was mounted to the failed container. This storage volume may be the same as or different from a storage volume storing the state of the failed container according to FIGS. 24 and 25.

If the monitoring of the containers and storage volumes is found 2820 to indicate a failed storage volume or storage node 106, the method 2800 may include re-provisioning and repairing 2822 the storage volume. Detecting a fault and effecting repair may be performed using the approach described above with respect to FIGS. 20-23.

In particular, where a new node is selected to host a storage volume due to a fault, this new node may meet provisioning constraints of the bundled application 1302 to which the failed storage volume was allocated. For example, the new node may be selected such that it:

Satisfies any fault domain ("anti-affinity") constraints such that the node selected is not the same node hosting another storage volume of the bundled application 1302 that is in a different fault domain.

Satisfies any latency ("affinity") constraints such that the node selected is on the same node as a container required to be co-located with the storage volume (the container may be moved to a new node to achieve this in some embodiments) or is otherwise in a required proximity (same node, rack, data center, etc.) to another resource (container, storage volume) of the bundled application 1302 as specified by the bundled application 1302.

The monitoring of step 2806 may be performed periodically throughout the functioning of the bundled application 1302 while autopilot is functioning. Accordingly, some or all of steps 2808-2822 may be performed over time when monitoring 2806 is found 2808, 2820 to indicate a fault.

Figure 29:
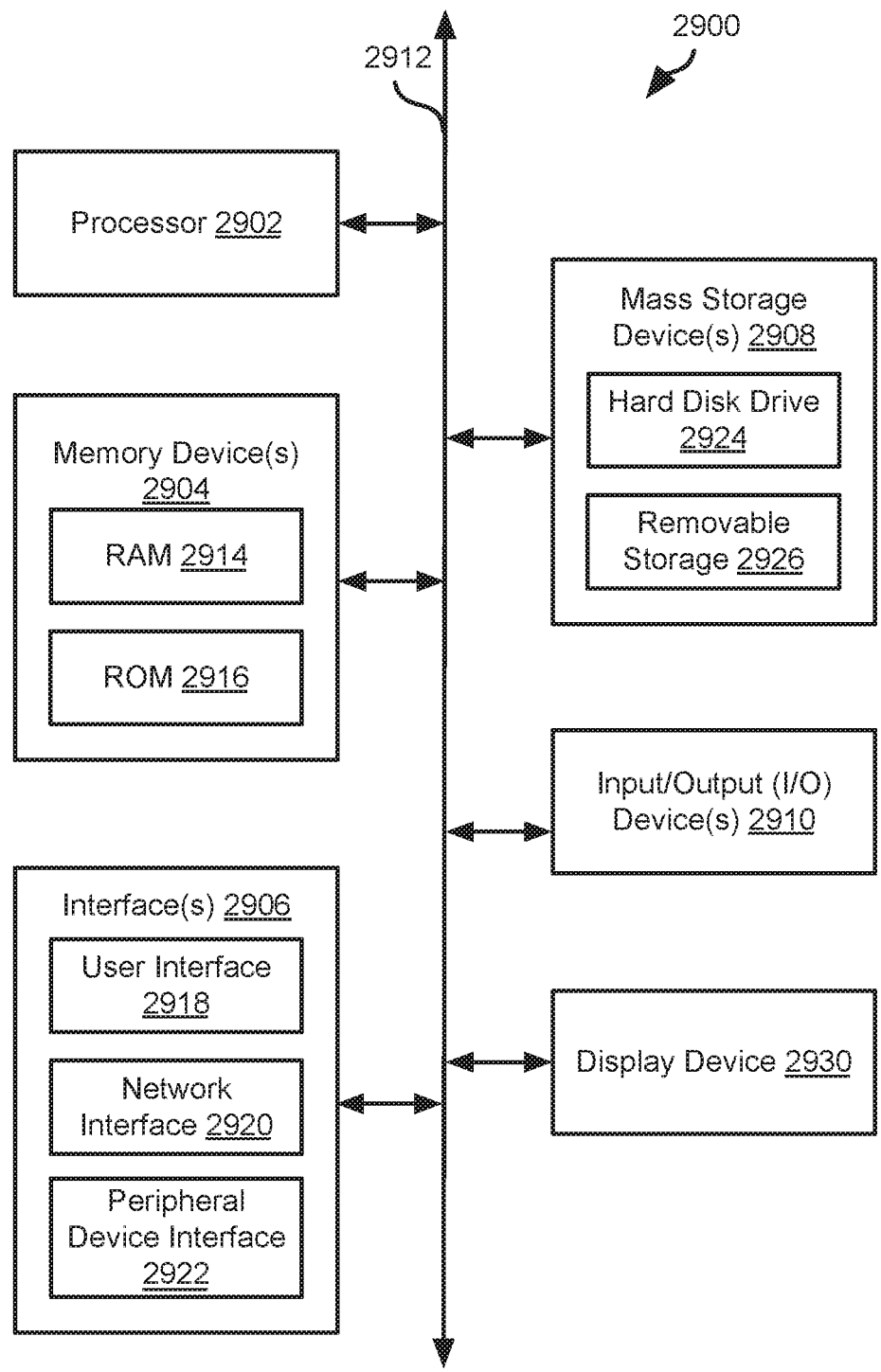
FIG. 29 is a schematic block diagram of an example computing device suitable for implementing methods in accordance with embodiments of the invention.

FIG. 29 is a block diagram illustrating an example computing device 2900. Computing device 2900 may be used to perform various procedures, such as those discussed herein. The storage manager 102, storage nodes 106, compute nodes 110, and hybrid nodes may have some or all of the attributes of the computing device 2900.

Computing device 2900 includes one or more processor(s) 2902, one or more memory device(s) 2904, one or more interface(s) 2906, one or more mass storage device(s) 2908, one or more Input/output (I/O) device(s) 2910, and a display device 2930 all of which are coupled to a bus 2912. Processor(s) 2902 include one or more processors or controllers that execute instructions stored in memory device(s) 2904 and/or mass storage device(s) 2908. Processor(s) 2902 may also include various types of computer-readable media, such as cache memory.

Memory device(s) 2904 include various computer-readable media, such as volatile memory (e.g., random access memory (RAM) 2914) and/or nonvolatile memory (e.g., read-only memory (ROM) 2916). Memory device(s) 2904 may also include rewritable ROM, such as Flash memory.

Mass storage device(s) 2908 include various computer readable media, such as magnetic tapes, magnetic disks, optical disks, solid-state memory (e.g., Flash memory), and so forth. As shown in FIG. 29, a particular mass storage device is a hard disk drive 2924. Various drives may also be included in mass storage device(s) 2908 to enable reading from and/or writing to the various computer readable media. Mass storage device(s) 2908 include removable media 2926 and/or non-removable media.

I/O device(s) 2910 include various devices that allow data and/or other information to be input to or retrieved from computing device 2900. Example I/O device(s) 2910 include cursor control devices, keyboards, keypads, microphones, monitors or other display devices, speakers, printers, network interface cards, modems, lenses, CCDs or other image capture devices, and the like.

Display device 2930 includes any type of device capable of displaying information to one or more users of computing device 2900. Examples of display device 2930 include a monitor, display terminal, video projection device, and the like.

Interface(s) 2906 include various interfaces that allow computing device 2900 to interact with other systems, devices, or computing environments. Example interface(s) 2906 include any number of different network interfaces 2920, such as interfaces to local area networks (LANs), wide area networks (WANs), wireless networks, and the Internet. Other interface(s) include user interface 2918 and peripheral device interface 2922. The interface(s) 2906 may also include one or more peripheral interfaces such as interfaces for printers, pointing devices (mice, track pad, etc.), keyboards, and the like.

Bus 2912 allows processor(s) 2902, memory device(s) 2904, interface(s) 2906, mass storage device(s) 2908, I/O device(s) 2910, and display device 2930 to communicate with one another, as well as other devices or components coupled to bus 2912. Bus 2912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2900, and are executed by processor(s) 2902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   deploying, by a first computing device, a bundled application on a plurality of computing devices of a distributed computing system, the bundled application including a plurality of containers executing on the plurality of computing devices, each container of the plurality of containers executing an application instance forming part of the bundled application;
   monitoring, by the first computing device, a state of each container of the plurality of containers; and
   invoking at least one of restarting, redeploying, and moving containers of the plurality of containers, by the first computing device, effective to maintain a state of the bundled application in response to any faults indicated by the monitoring;
   (a) detecting, by the first computing device, failure of a first container of the plurality of containers executing on a second computing device of the plurality of computing devices;
   (b) in response to (a), invoking restarting of the first container on the second computing device;
   (c) determining that (b) did not resolve the failure of the first container; and
   (d) in response to (c), invoking redeploying of the first container on the second computing device.

2. The method of claim 1, further comprising:
   (e) determining that (d) did not resolve failure of the first container;
   (f) in response to (e), invoking deployment of a second container on a third computing device of the plurality of computing devices and restoring a state of the first container in the second container.

3. The method of claim 1, further comprising:
   deploying a plurality of first containers of the plurality of containers on a second computing device of the plurality of computing devices;
   associating each container of the plurality of first containers with a port on the second computing device; and
   periodically querying, by an agent, the port associated with each container of the plurality of first containers to determine a state of the each container, the agent being software executing on one of the second computing device and another computing device.

4. The method of claim 1, wherein a plurality of storage volumes are mounted to the plurality of containers.

5. The method of claim 4, further comprising:
   monitoring, by the first computing device, a state of the plurality of storage volumes;
   in response to failure of a first storage volume of the plurality of storage volumes:
       invoking re-provisioning and remounting of a new storage volume to replace the first storage volume; and
       instructing the bundled application to re-sync the new storage volume from one or more replicas of the first storage volume.

6. The method of claim 4, wherein the plurality of storage volumes each include one or more replicas, the method further comprising:
in response to failure of a first storage volume of the plurality of storage volumes:
invoking re-provisioning and remounting of a new storage volume to replace the first storage volume; and
restoring the new storage volume to include contents of the first storage volume using the one or more replicas of the first storage volume.

7. A method comprising:
deploying, by a first computing device, a bundled application on a plurality of computing devices of a distributed computing system, the bundled application including a plurality of containers executing on the plurality of computing devices, each container of the plurality of containers executing an application instance forming part of the bundled application;
monitoring, by the first computing device, a state of each container of the plurality of containers;
invoking at least one of restarting, redeploying, and moving containers of the plurality of containers, by the first computing device, effective to maintain a state of the bundled application in response to any faults indicated by the monitoring;
deploying a plurality of first containers of the plurality of containers on a second computing device of the plurality of computing devices;
associating each container of the plurality of first containers with a port on the second computing device;
periodically querying, by an agent, the port associated with each container of the plurality of first containers to determine a state of the each container, the agent being software executing on one of the second computing device and another computing device;
initiating a parent process on the second computing device;
starting, by the parent process a container daemon;
initiating, by the container daemon the plurality of first containers; and
implementing a socket on the second computing device by the container daemon;
wherein associating each container of the plurality of first containers with the port on the second computing device comprises associating, by the container daemon, each container of the plurality of first containers with a port of the socket.

8. The method of claim 7, further comprising:
obtaining, by the agent, a mapping of the port of the socket with the plurality of first containers from the container daemon; and
querying, by the agent, the port associated with each container of the plurality of first containers according to the mapping.

9. A system comprising:
a first computing device comprising one or more processing devices and one or more memory devices operably coupled to the one or more processing devices, the one or more memory devices storing executable code effective to cause the one or more processing devices to:
deploy a bundled application on a plurality of computing devices of a distributed computing system, the bundled application including a plurality of containers executing on the plurality of computing devices, each container of the plurality of containers executing an application instance forming part of the bundled application;
monitor a state of each container of the plurality of containers; and
invoke at least one of restarting, redeploying, and moving containers of the plurality of containers effective to maintain a state of the bundled application in response to any faults indicated by the monitoring;
wherein the executable code is further effective to cause the one or more processing devices to:
(a) detect failure of a first container of the plurality of containers executing on a second computing device of the plurality of computing devices;
(b) in response to (a), invoke restarting of the first container on the second computing device;
(c) determine that (b) did not resolve the failure of the first container; and
(d) in response to (c), invoke redeploying of the first container on the second computing device.

10. The system of claim 9, wherein the executable code is further effective to cause the one or more processing devices to:
(e) determine that (d) did not resolve failure of the first container;
(f) in response to (e), invoke deployment of a second container on a third computing device of the plurality of computing devices and restoring a state of the first container in the second container.

11. The system of claim 9, wherein the executable code is further effective to cause the one or more processing devices to:
deploy a plurality of first containers of the plurality of containers on a second computing device of the plurality of computing devices;
associate each container of the plurality of first containers with a port on the second computing device; and
invoke periodically querying, by an agent, the port associated with each container of the plurality of first containers to determine a state of the each container, the agent being software executing on one of the second computing device and another computing device.

12. The system of claim 9, further comprising a plurality of storage volumes mounted to the plurality of containers.

13. The system of claim 12, wherein the executable code is further effective to cause the one or more processing devices to:
monitor a state of the plurality of storage volumes;
in response to failure of a first storage volume of the plurality of storage volumes:
invoke re-provisioning and remounting of a new storage volume to replace the first storage volume; and
instruct the bundled application to re-sync the new storage volume from one or more replicas of the first storage volume.

14. The system of claim 12, wherein the plurality of storage volumes each include one or more replicas;
wherein the executable code is further effective to cause the one or more processing devices to:
in response to failure of a first storage volume of the plurality of storage volumes:
invoke re-provisioning and remounting of a new storage volume to replace the first storage volume; and
restore the new storage volume to include contents of the first storage volume using the one or more replicas of the first storage volume.

15. A system comprising:
a first computing device comprising one or more processing devices and one or more memory devices operably coupled to the one or more processing devices, the one or more memory devices storing executable code effective to cause the one or more processing devices to:
deploy a bundled application on a plurality of computing devices of a distributed computing system, the bundled application including a plurality of containers executing on the plurality of computing devices, each container of the plurality of containers executing an application instance forming part of the bundled application;
monitor a state of each container of the plurality of containers; and
invoke at least one of restarting, redeploying, and moving containers of the plurality of containers effective to maintain a state of the bundled application in response to any faults indicated by the monitoring;
deploy a plurality of first containers of the plurality of containers on a second computing device of the plurality of computing devices;
associate each container of the plurality of first containers with a port on the second computing device; and
invoke periodically querying, by an agent, the port associated with each container of the plurality of first containers to determine a state of the each container, the agent being software executing on one of the second computing device and another computing device; and
the second computing device, the second computing device further programmed to:
initiate a parent process on the second computing device;
start, by the parent process a container daemon;
initiate, by the container daemon the plurality of first containers; and
implement a socket on the second computing device by the container daemon;
associate each container of the plurality of first containers with the port on the second computing device by associating, by the container daemon, each container of the plurality of first containers with a port of the socket.

16. The system of claim 15, wherein the agent is further programmed to:
obtain a mapping of the port of the socket with the plurality of first containers from the container daemon; and
query the port associated with each container of the plurality of first containers according to the mapping.

* * * * *